US 11,867,306 B2

(12) United States Patent
Jax et al.

(10) Patent No.: US 11,867,306 B2
(45) Date of Patent: *Jan. 9, 2024

(54) REFUSE VEHICLE BODY ASSEMBLY

(71) Applicant: Oshkosh Corporation, Oshkosh, WI (US)

(72) Inventors: Kevin G. Jax, Oshkosh, WI (US); Clinton Weckwerth, Pine Island, MN (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,586

(22) Filed: Aug. 19, 2022

(65) Prior Publication Data

US 2022/0403940 A1 Dec. 22, 2022

Related U.S. Application Data

(63) Continuation of application No. 17/090,434, filed on Nov. 5, 2020, now Pat. No. 11,454,326, which is a continuation of application No. 16/417,521, filed on May 20, 2019, now Pat. No. 10,859,167.

(60) Provisional application No. 62/674,894, filed on May 22, 2018.

(51) Int. Cl.
*B65F 3/04* (2006.01)
*F16K 3/02* (2006.01)
*F01L 1/46* (2006.01)
*F01L 1/26* (2006.01)
*B65F 3/02* (2006.01)

(52) U.S. Cl.
CPC ............... *F16K 3/02* (2013.01); *B65F 3/041* (2013.01); *F01L 1/26* (2013.01); *F01L 1/46* (2013.01); *B65F 2003/025* (2013.01); *B65F 2003/0223* (2013.01)

(58) Field of Classification Search
CPC ................................. B65F 3/041; B65F 3/201
See application file for complete search history.

(56) References Cited

U.S. PATENT DOCUMENTS

| 778,228 A | 12/1904 | Dodge et al. |
| 5,681,140 A | 10/1997 | Christenson |
| 5,797,715 A | 8/1998 | Christenson |
| 5,919,027 A | 7/1999 | Christenson |
| 5,934,858 A | 8/1999 | Christenson |

(Continued)

FOREIGN PATENT DOCUMENTS

| CN | 105059798 A | 11/2015 |
| EP | 0 778 228 A1 | 6/1997 |

OTHER PUBLICATIONS

International Search Report and Written Opinion regarding Int'l. Application No. PCT/US2019/033171, dated Jul. 25, 2019, 9 pages.

*Primary Examiner* — Jonathan Snelting
(74) *Attorney, Agent, or Firm* — Foley & Lardner LLP

(57) ABSTRACT

A refuse body assembly includes a body, a bracket, and a valve assembly. The body defines a compartment. The body includes a bottom wall defining a horizontal plane and a front wall defining a vertical plane. The bracket has an arm that is coupled to and extends rearward from the front wall into the compartment at an angle such that the arm is neither parallel with the horizontal plane nor parallel with the vertical plane. The valve assembly is coupled to the bracket.

19 Claims, 28 Drawing Sheets

(56) References Cited

U.S. PATENT DOCUMENTS

| | | |
|---|---|---|
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,971,694 A | 10/1999 | McNeilus et al. |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,284,943 B2 | 10/2007 | Pruteanu et al. |
| 7,556,468 B2 | 7/2009 | Grata |
| 7,559,733 B2 | 7/2009 | Khan et al. |
| 7,559,735 B2 | 7/2009 | Pruteanu et al. |
| 7,878,750 B2 | 2/2011 | Zhou et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,807,613 B2 | 8/2014 | Howell et al. |
| 9,216,856 B2 | 12/2015 | Howell et al. |
| 9,387,985 B2 | 7/2016 | Gillmore et al. |
| 9,880,581 B2 | 1/2018 | Kuriakose et al. |
| 9,981,803 B2 | 5/2018 | Davis et al. |
| 10,196,205 B2 | 2/2019 | Betz et al. |
| 10,859,167 B2 | 12/2020 | Jax et al. |
| 11,454,326 B2 * | 9/2022 | Jax .................. F01L 1/46 |
| 2006/0245882 A1 | 11/2006 | Khan et al. |
| 2016/0340120 A1 | 11/2016 | Curotto et al. |
| 2017/0247186 A1 | 8/2017 | Whitfield et al. |
| 2017/0341860 A1 | 11/2017 | Dodds et al. |
| 2018/0026289 A1 | 1/2018 | Finnerty et al. |
| 2018/0129241 A1 | 5/2018 | Kuriakose et al. |
| 2019/0161272 A1 | 5/2019 | Betz et al. |
| 2019/0193934 A1 | 6/2019 | Rocholl et al. |

* cited by examiner

REFUSE VEHICLE BODY ASSEMBLY

CROSS-REFERENCE TO RELATED PATENT APPLICATION

This application is a continuation of U.S. patent application Ser. No. 17/090,434, filed Nov. 5, 2020, which is a continuation of U.S. patent application Ser. No. 16/417,521, filed May 20, 2019, which claims the benefit of and priority to U.S. Provisional Patent Application No. 62/674,894, filed May 22, 2018, all of which are incorporated herein by reference in their entireties.

BACKGROUND

Refuse vehicles collect a wide variety of waste, trash, and other material from residences and businesses. Operators of the refuse vehicles transport the material from various waste receptacles within a municipality to a storage or processing facility (e.g., a landfill, an incineration facility, a recycling facility, etc.).

Refuse vehicles typically include hydraulic actuators that drive various functions of the refuse vehicle, such as lifting refuse containers, packing refuse within a body assembly, ejecting refuse from a body assembly, and opening various doors and hatches. The extension and retraction of the hydraulic actuators, among other functions, is controlled by valves. Conventionally, these valves are placed near the front end of the body near the exhaust system of the refuse vehicle. These hydraulic valves and hydraulic lines coupled thereto have the potential to leak, directing hydraulic oil onto the exhaust components. The heat from the exhaust components causes the hydraulic oil to react, which is undesirable.

SUMMARY

One embodiment relates to a refuse body assembly for a refuse vehicle. The refuse body assembly includes a body, a bracket, and a valve assembly. The body defines a compartment. The body includes a bottom wall defining a horizontal plane and a front wall defining a vertical plane. The bracket has an arm that is coupled to and extends rearward from the front wall into the compartment at an angle such that the arm is neither parallel with the horizontal plane nor parallel with the vertical plane. The valve assembly is coupled to the bracket.

Another embodiment relates to a refuse body assembly for a refuse vehicle. The refuse body assembly includes a body, a bracket, a valve assembly, and a removable cover. The body defines a compartment. The body includes a front wall that defines an aperture. The bracket is coupled to the front wall and extends into the compartment. The valve assembly is coupled to the bracket such that at least a portion of the valve assembly is accessible through the aperture. The removable cover is coupled to the front wall. The removable cover is positioned to selectively enclose at least a portion of the aperture.

Still another embodiment relates to a refuse body assembly for a refuse vehicle. The refuse body assembly includes a body and a bracket. The body defines a compartment. The body includes a bottom wall defining a horizontal plane and a front wall defining a vertical plane. The bracket is coupled to the front wall. The bracket has an arm extending rearward of the front wall into the compartment at an angle such that the arm is neither parallel with the horizontal plane nor parallel with the vertical plane.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
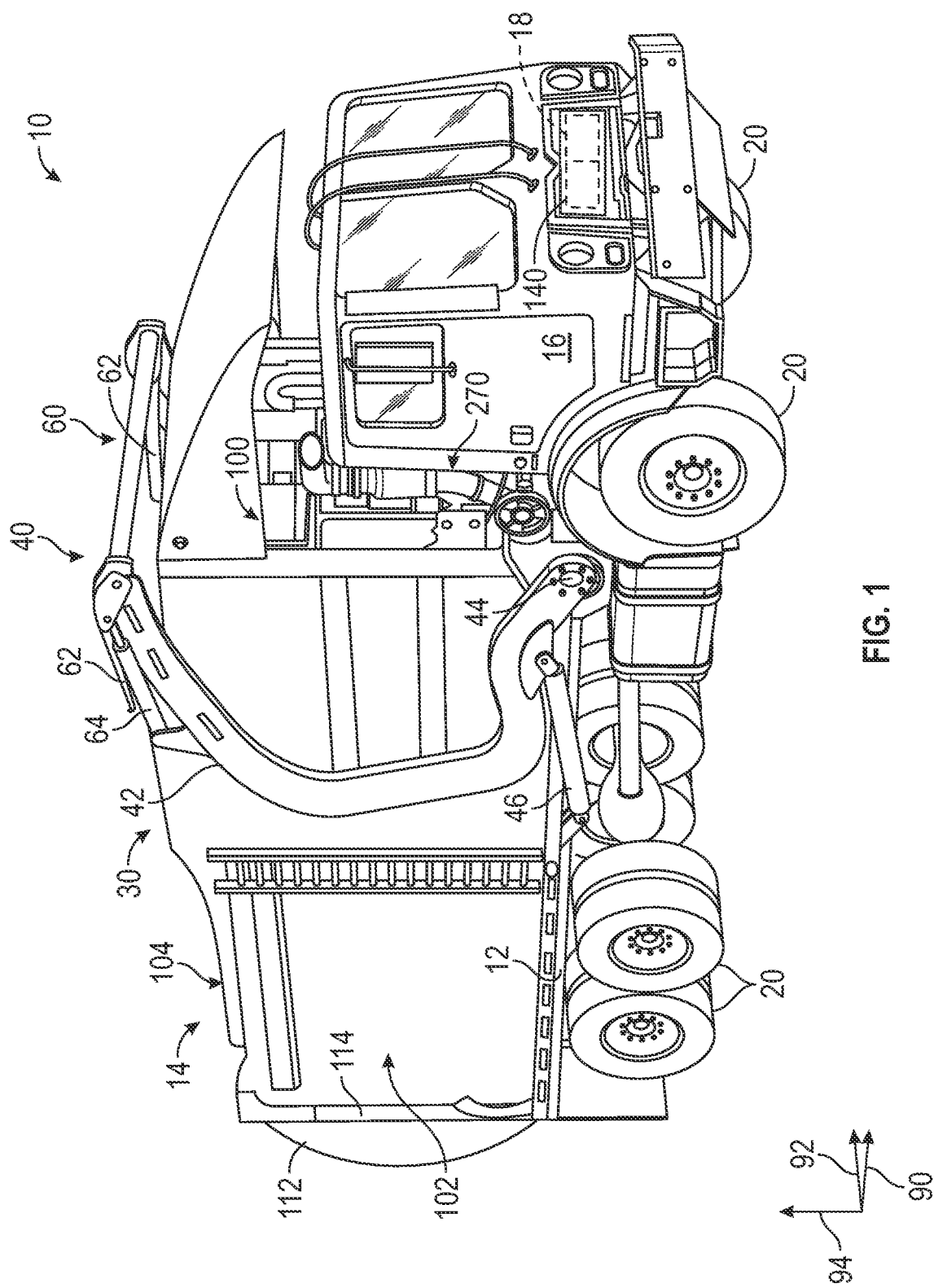
FIG. 1 is a perspective view of a front-loading refuse vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a refuse vehicle (e.g., a front-loading refuse vehicle, a side-loading refuse vehicle, a rear-loading refuse vehicle, etc.) includes a chassis supported by a plurality of tractive elements, a cab coupled to the chassis, an engine positioned below the cab and configured to drive the tractive elements, and a body assembly positioned rearward of the cab that defines a refuse compartment that stores refuse for transport. A lift assembly is pivotally coupled to the body assembly and configured to engage, lift, and dump a refuse container such that refuse from the refuse container is stored in the refuse compartment of the body assembly. An ejector moves longitudinally through the refuse compartment to compact and/or eject the refuse out of the rear end of the body assembly. A tailgate is pivotally coupled to the body assembly such that the tailgate selectively prevents ejection of refuse. The lift assembly, the ejector, and the tailgate are all actuated through extension and retraction of various hydraulic actuators (e.g., hydraulic cylinders, etc.).

A valve assembly is configured to control the flow of hydraulic fluid to and/or from one or more hydraulic components (e.g., the hydraulic cylinders, tailgate hydraulic actuators, top door hydraulic actuators, fork hydraulic actuators, etc.). The valve assembly is coupled to a front wall of the body assembly. The valve assembly may be coupled to a support surface of a mounting bracket. The support surface and the valve assembly may be oriented between horizontal and vertical (e.g., such that a first end of the valve assembly may be positioned longitudinally forward of and vertically above a second end of the valve assembly, etc.). The mounting bracket may be arranged such that both the mounting bracket and the valve assembly extend within the refuse compartment. When the ejector is in a fully retracted position, the valve assembly and the mounting bracket may be positioned directly below the ejector and extend into a cavity defined thereby. This position of the valve assembly may be further rearward than that of a conventional refuse vehicle. The rearward positioning of the valve assembly may be facilitated by an angled orientation of the valve assembly, which prevents interference between the ejector and the valve assembly.

An exhaust system coupled to the engine may be positioned along the rear side of the cab adjacent the valve assembly. Valve assemblies and tubes fluidly coupled thereto are prone to leaking hydraulic fluid in certain circumstances. The placement of the valve assembly in a conventional refuse vehicle allows the leaked hydraulic fluid to spray directly onto the exhaust system, which can cause the hydraulic fluid to heat up and react. Advantageously, the rearward positioning of the valve assembly presented herein facilitates placing a cover between the valve assembly and the exhaust system. The cover may thereby prevent hydraulic oil from spraying onto the exhaust system. Additionally, the rearward positioning of the valve assembly may facilitate positioning the tubes such that the tubes extend from the valve assembly and into/within the refuse compartment, such that the front wall of the body assembly prevents a leak of hydraulic fluid along the length of a tube from spraying directly onto the exhaust system. Such an arrangement may facilitate easier routing of the tubes.

According to the exemplary embodiment shown in FIG. 1, a vehicle, shown as refuse vehicle 10 (e.g., a refuse truck, a garbage truck, a waste collection truck, a sanitation truck, a recycling truck, etc.), is configured as a front-loading refuse vehicle. In other embodiments, the refuse vehicle 10 is configured as a side-loading refuse vehicle. In still other embodiments, the refuse vehicle 10 is configured as a rear-loading refuse vehicle. As shown in FIG. 1, the refuse vehicle 10 includes a chassis, shown as frame 12; a body assembly, shown as body 14, coupled to the frame 12 (e.g., at a rear end thereof, etc.); and a front cabin, shown as cab 16, coupled to the frame 12 (e.g., at a front end thereof, etc.) forward of the body 14. The cab 16 may include various components to facilitate operation of the refuse vehicle 10 by an operator (e.g., a seat, a steering wheel, hydraulic controls, a user interface, switches, buttons, dials, etc.). As shown in FIG. 1, the refuse vehicle 10 includes a prime mover, shown as engine 18, coupled to the frame 12 at a position beneath the cab 16. The engine 18 is configured to provide power to a plurality of tractive elements, shown as wheels 20, and/or to other systems of the refuse vehicle 10 (e.g., a pneumatic system, a hydraulic system, etc.). The engine 18 may be configured to utilize one or more of a variety of fuels (e.g., gasoline, diesel, bio-diesel, ethanol, natural gas, propane, etc.), according to various exemplary embodiments. According to an alternative embodiment, the engine 18 additionally or alternatively includes one or more electric motors coupled to the frame 12 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 10.

Figure 2:
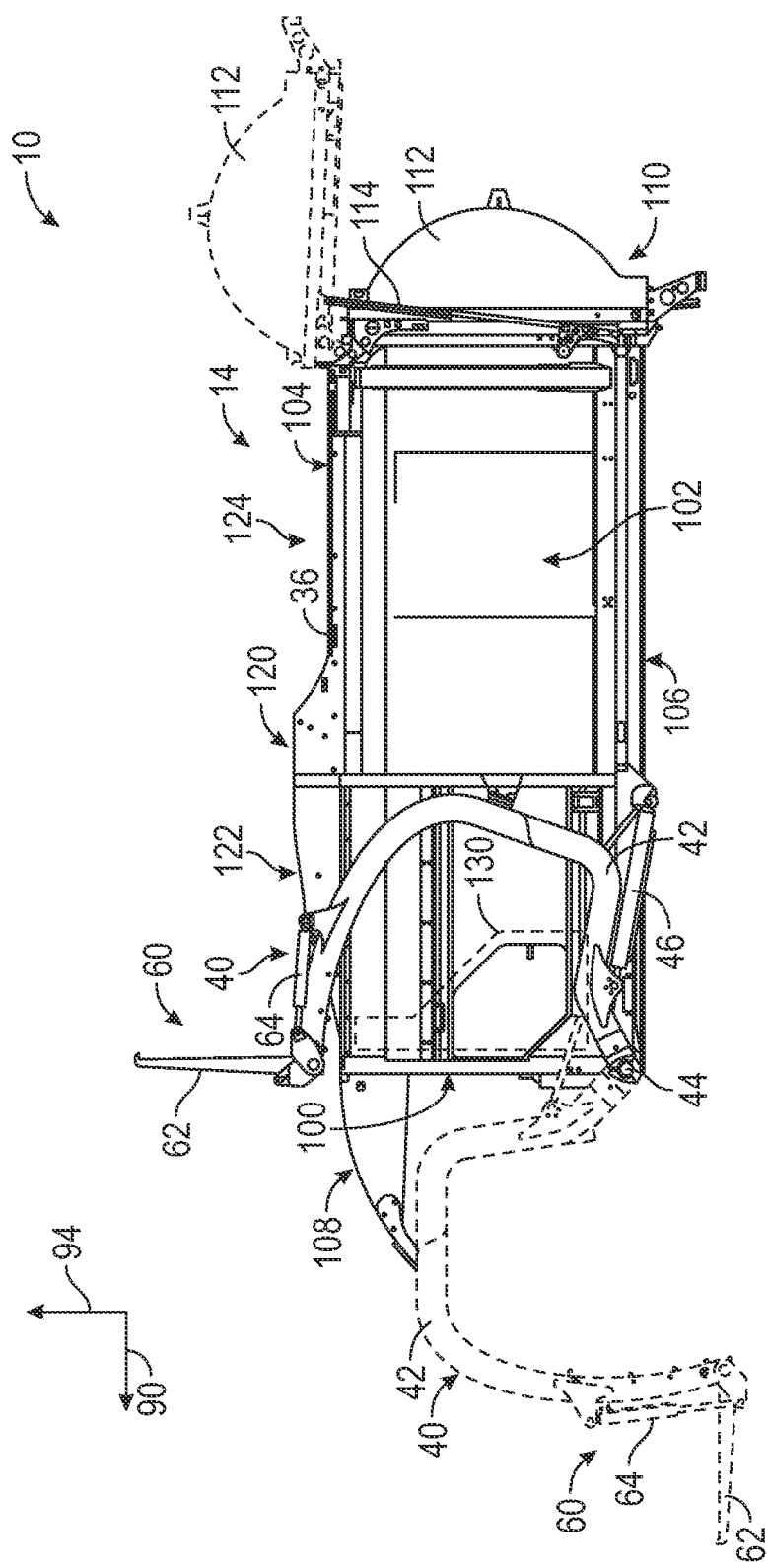
FIG. 2 is a side view of a body assembly, a lift assembly, and a tailgate of the front-loading refuse vehicle of FIG. 1 in two different configurations, according to an exemplary embodiment.
Figure 3:
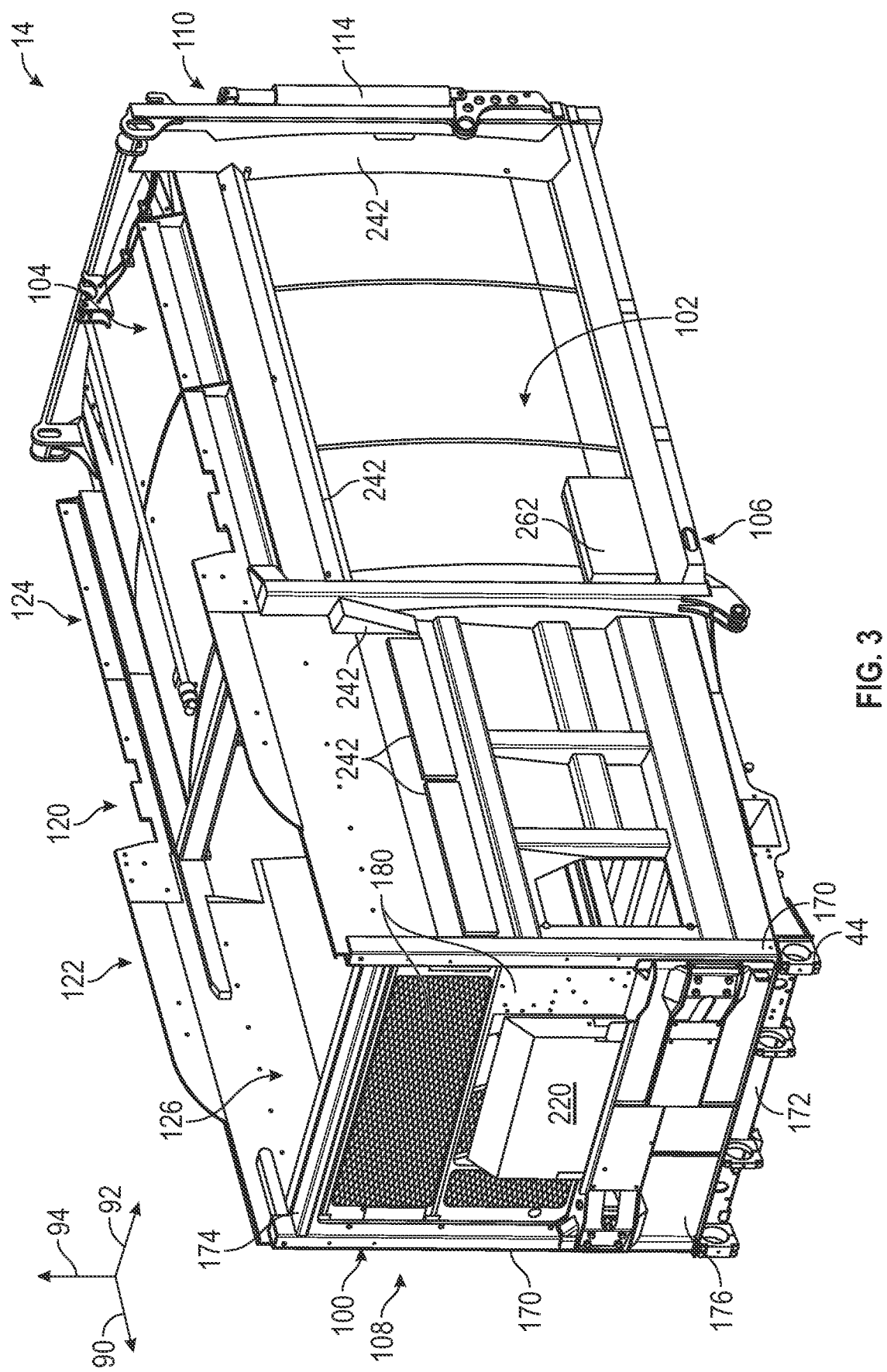
FIGS. 3-5 are perspective views of the body assembly of FIG. 2.
Figure 4:
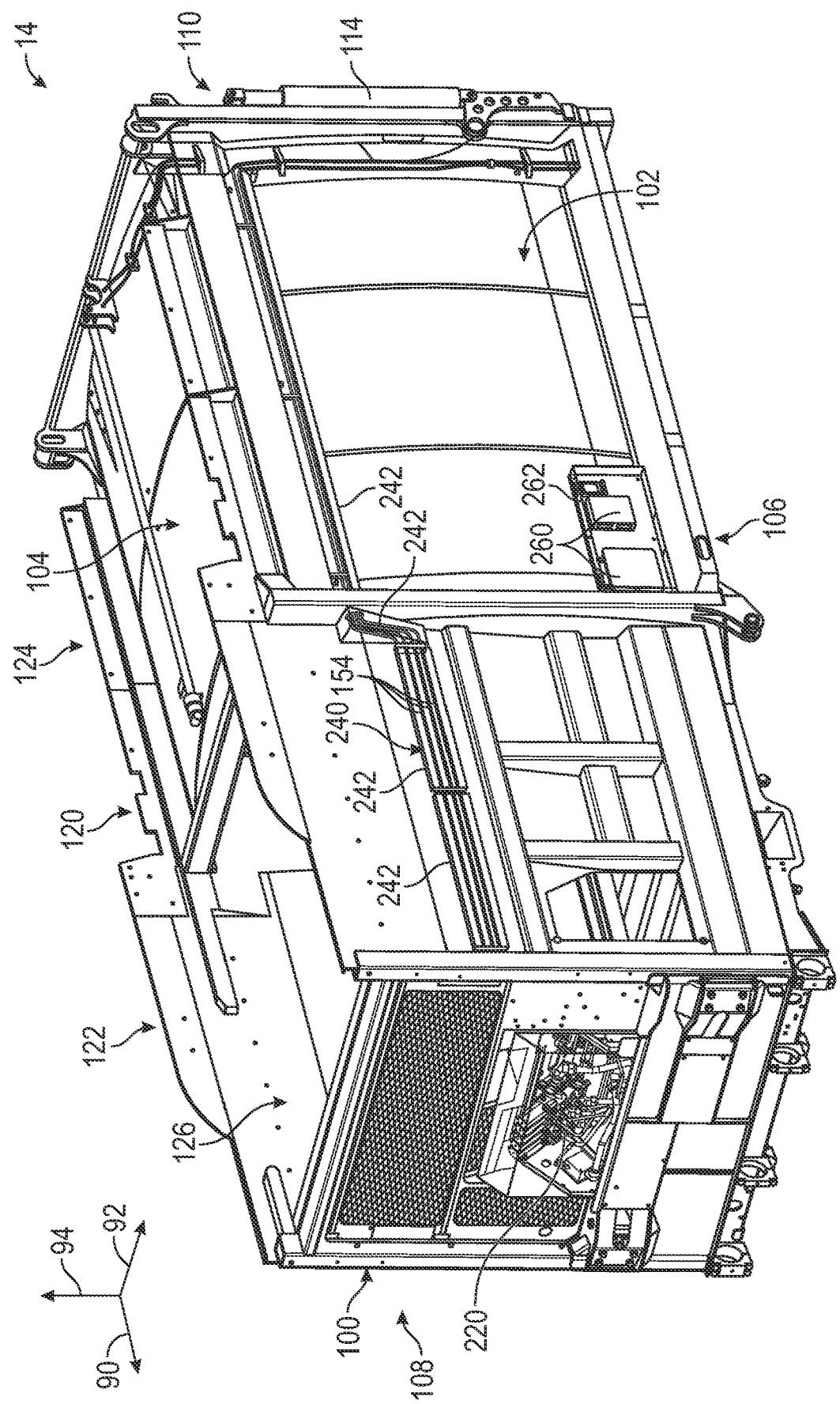
Figure 5:
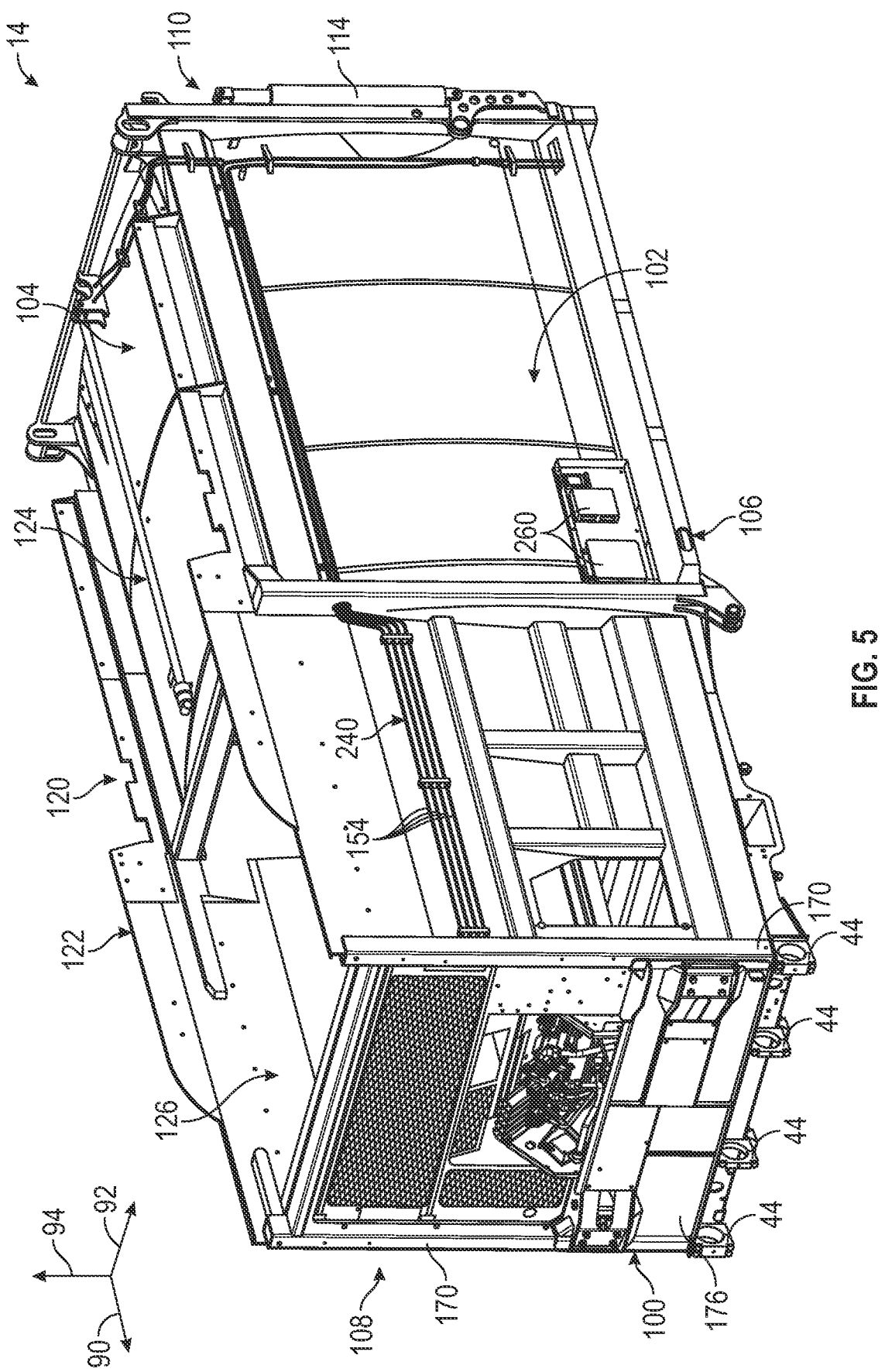

According to an exemplary embodiment, the refuse vehicle 10 is configured to transport refuse from various waste receptacles or refuse containers within a municipality to a storage and/or processing facility (e.g., a landfill, an incineration facility, a recycling facility, etc.). As shown in FIGS. 1 and 2, the refuse vehicle 10 includes a first lift mechanism/system (e.g., a front-loading lift assembly, a side-loading lift assembly, a rear-loading assembly, etc.), shown as lift assembly 40. FIG. 2 shows the lift assembly 40 in both a raised position (e.g., a dumping position, a transport position, etc.) and a lowered position (e.g., an acquisition position, an engagement/disengagement position, etc.). The lift assembly 40 includes a pair of arms, shown as lift arms 42, coupled to the body 14 on each side of the refuse vehicle 10 such that the lift arms 42 extend forward of the cab 16 in the lowered position (e.g., a front-loading refuse vehicle, etc.). The lift arms 42 are rotatably coupled to body 14 with a pivot 44 (e.g., a lug, a shaft, etc.). As shown in FIG. 1, the lift assembly 40 includes first actuators, shown as lift arm actuators 46 (e.g., hydraulic cylinders, etc.), coupled to the frame 12 and the lift arms 42. The lift arm actuators 46 are positioned such that extension and retraction thereof rotates the lift arms 42 about an axis extending through the pivot 44 (e.g., parallel to the lateral axis 92), according to an exemplary embodiment.

As shown in FIGS. 1 and 2, a fork assembly 60 is coupled to the lift arms 42 of the lift assembly 40. The fork assembly 60 includes a pair of forks, shown as forks 62, with one pivotally coupled to each of the lift arms 42. In some embodiments, the forks 62 are coupled to one another through an intermediate plate (e.g., both forks 62 are coupled (e.g., attached, fastened, welded, etc.) to a plate. The forks 62 may have a generally rectangular cross-sectional shape and are configured to engage a refuse container (e.g., protrude through fork pockets of a commercial refuse container, a carry can, etc.). During operation of the refuse vehicle 10, the forks 62 are positioned to engage the refuse container (e.g., the refuse vehicle 10 is driven into position such that the forks 62 protrude through fork pockets within the refuse container, etc.).

As shown in FIG. 1, the lift arms 42 are rotated by the lift arm actuators 46 to lift the forks 62 and the refuse container over the cab 16. As shown in FIGS. 1 and 2, the lift assembly 40 includes second actuators, shown as articulation actuators 64 (e.g., hydraulic cylinders, etc.). According to an exemplary embodiment, the articulation actuators 64 are positioned to articulate the forks 62 relative to the lift arms 42. Such articulation may assist in tipping refuse out of the refuse container (e.g., coupled to the lift assembly 40 by the fork assembly 60, etc.). The lift arm actuators 46 may thereafter rotate the lift arms 42 to return the refuse container to the ground.

Referring to FIGS. 1 and 2, a coordinate system is defined with respect to the body 14. Specifically, a longitudinal axis 90 extends within a horizontal plane along the direction of travel of the refuse vehicle 10. A lateral axis 92 extends within the horizontal plane and perpendicular to the longitudinal axis 90. A vertical axis 94 extends perpendicular to both the longitudinal axis 90 and the lateral axis 92.

As shown in FIGS. 2-5, the body 14 includes a head frame, shown as front wall 100, a pair of side walls 102, a top wall 104, and a bottom wall 106, each including a series of panels supported by a series of frame members. The front wall 100 is positioned at a front end 108 of the body 14, and the side walls 102, the top wall 104, and the bottom wall 106 all extend rearward from the front wall 100 toward a rear end 110 of the body 14. The front end 108 and the rear end 110 are defined with respect to a forward direction of travel of the refuse vehicle 10. In some embodiments, at least a portion of the body 14 extends above and/or in front of the cab 16. According to the embodiment shown in FIGS. 1 and 2, the body 14 is positioned behind the cab 16. A tailgate 112 is pivotally coupled to the side walls 102 at the rear end 110 of the body 14. A pair of third actuators, shown as tailgate actuators 114, rotate the tailgate 112 between a closed position (e.g., a lowered position, a sealed position, etc.) and an open position (e.g., a raised position, etc.), both of which are shown in FIG. 2.

Together, the front wall 100, the side walls 102, the top wall 104, the bottom wall 106, and the tailgate 112 define a collection chamber (e.g., hopper, etc.) or volume, shown as refuse compartment 120. The front wall 100 extends substantially perpendicular to the longitudinal axis 90. The side walls 102 extend substantially perpendicular to the lateral axis 92. The top wall 104 and the bottom wall 106 extend substantially perpendicular to the vertical axis 94. The refuse compartment 120 includes a first section, shown as hopper volume 122, and a second section, shown as storage volume 124. The hopper volume 122 is positioned between the storage volume 124 and the cab 16 (i.e., refuse is loaded into a position of the refuse compartment 120 behind the cab 16 and stored in a position further toward the rear of the refuse compartment 120). An aperture, shown as hopper opening 126, is positioned above the hopper volume 122. The hopper opening 126 facilitates placement of refuse into the hopper volume 122. The refuse vehicle 10 may include a door or hatch that selectively extends across the hopper opening 126 to seal the hopper opening 126, thereby preventing refuse from escaping the refuse compartment 120 (e.g., due to wind, bumps in the road, etc.).

Figure 6:
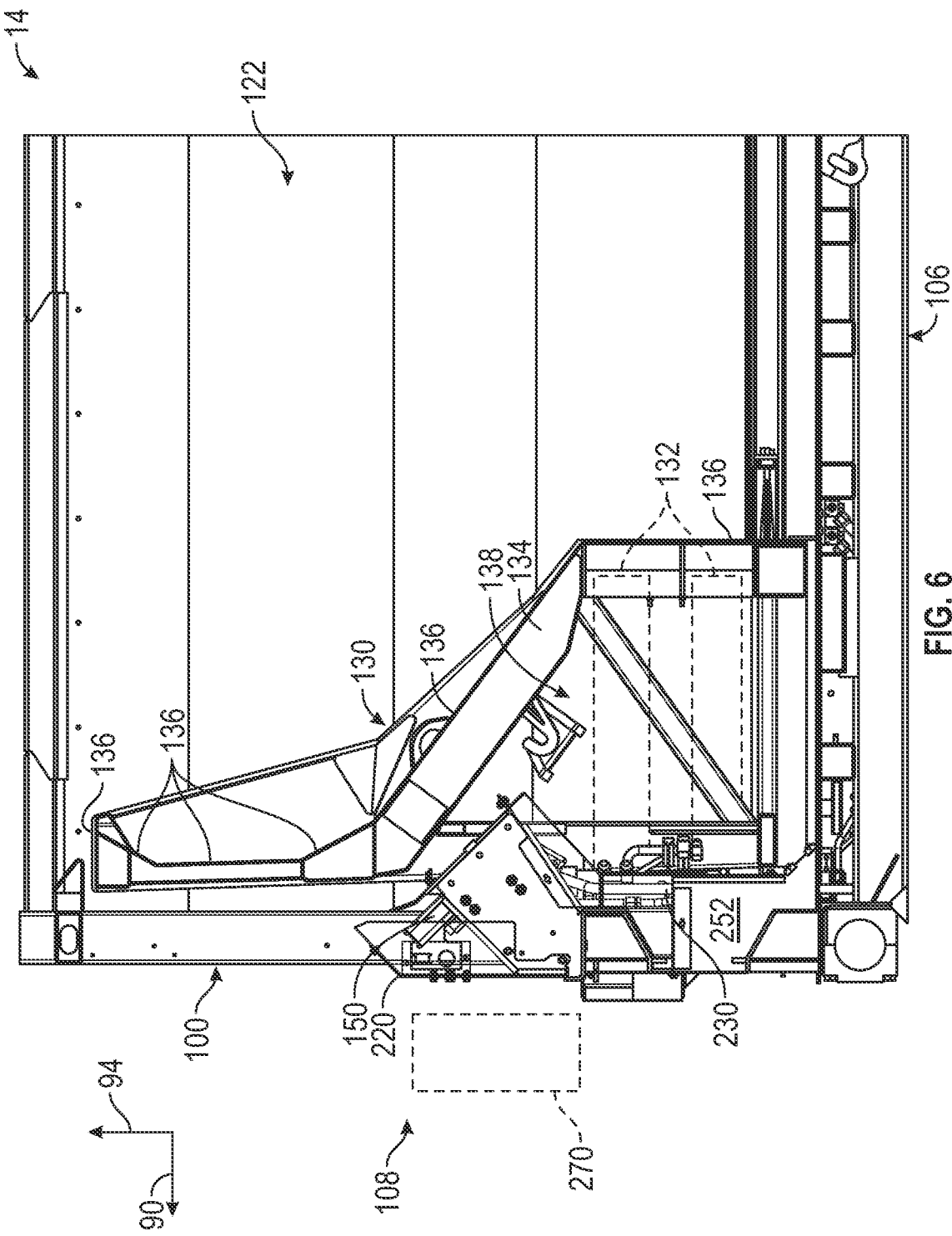
FIG. 6 is a side section view of the body assembly of FIG. 2.
Figure 7:
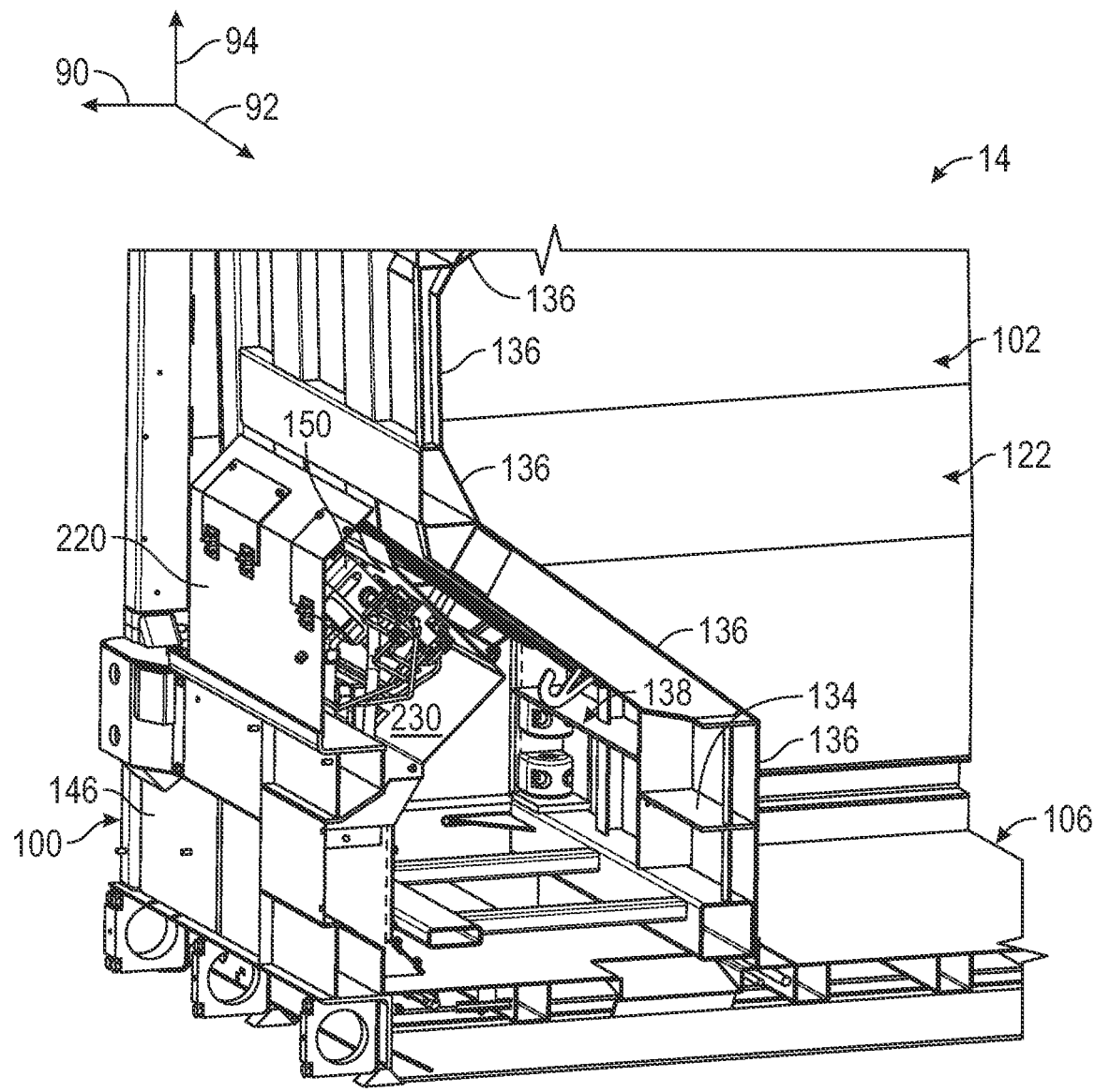
FIG. 7 is a perspective section view of the body assembly of FIG. 2.
Figure 8:
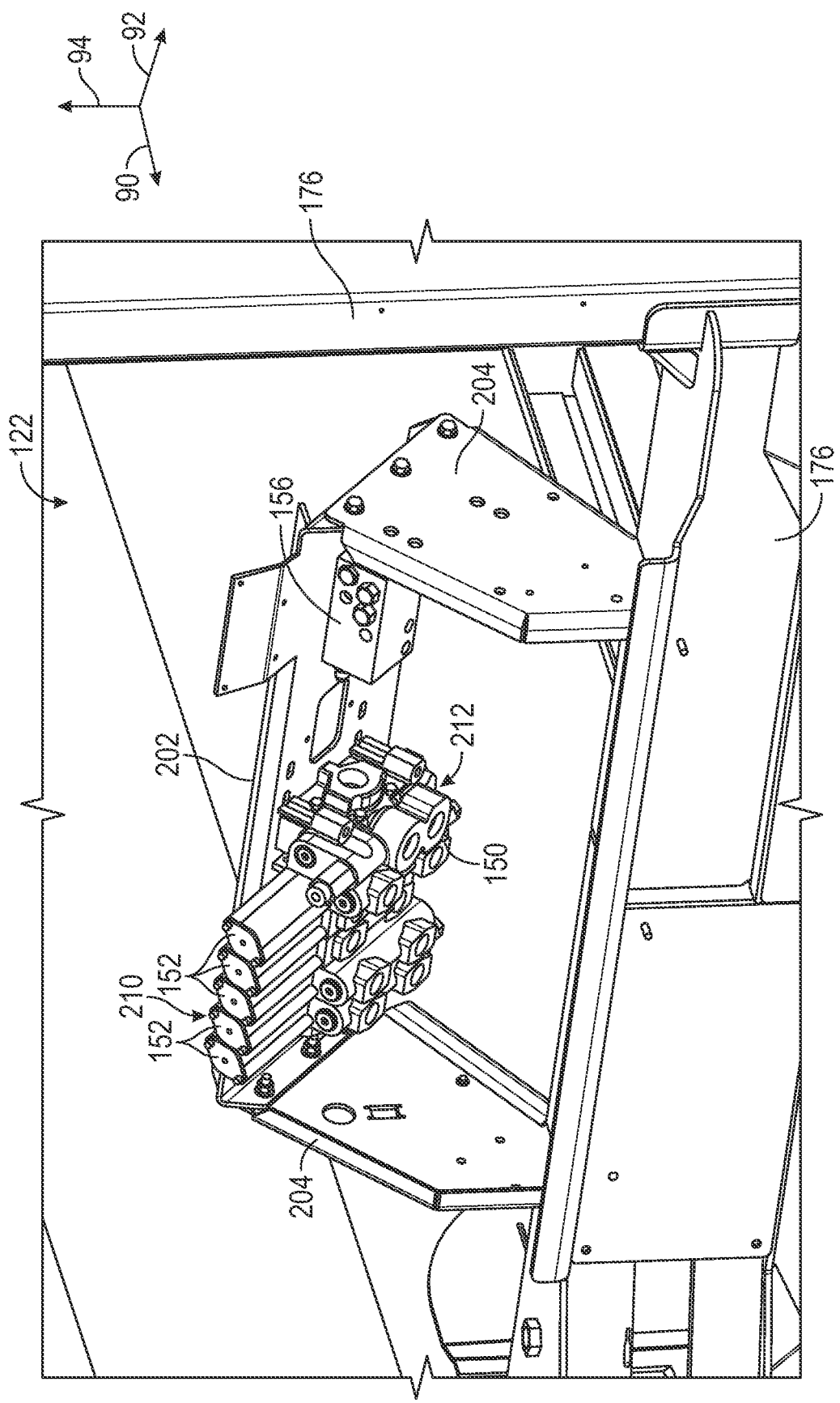
FIG. 8 is a perspective view of a mounting bracket of the body assembly of FIG. 2 and a valve assembly of the front-loading refuse vehicle of FIG. 1, according to an exemplary embodiment.
Figure 9:
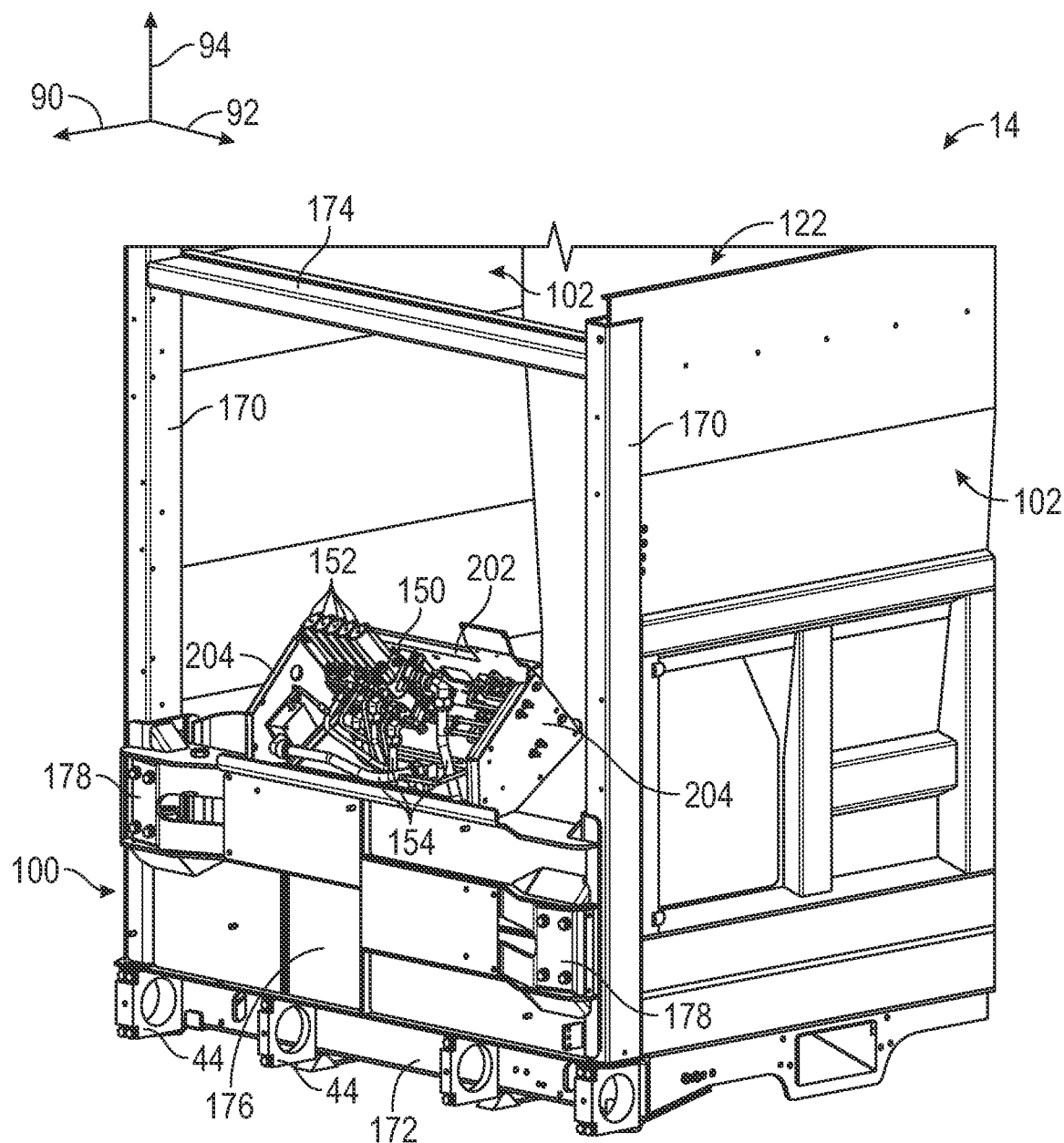
FIGS. 9-14 are front and perspective views of the body assembly of FIG. 2.
Figure 10:
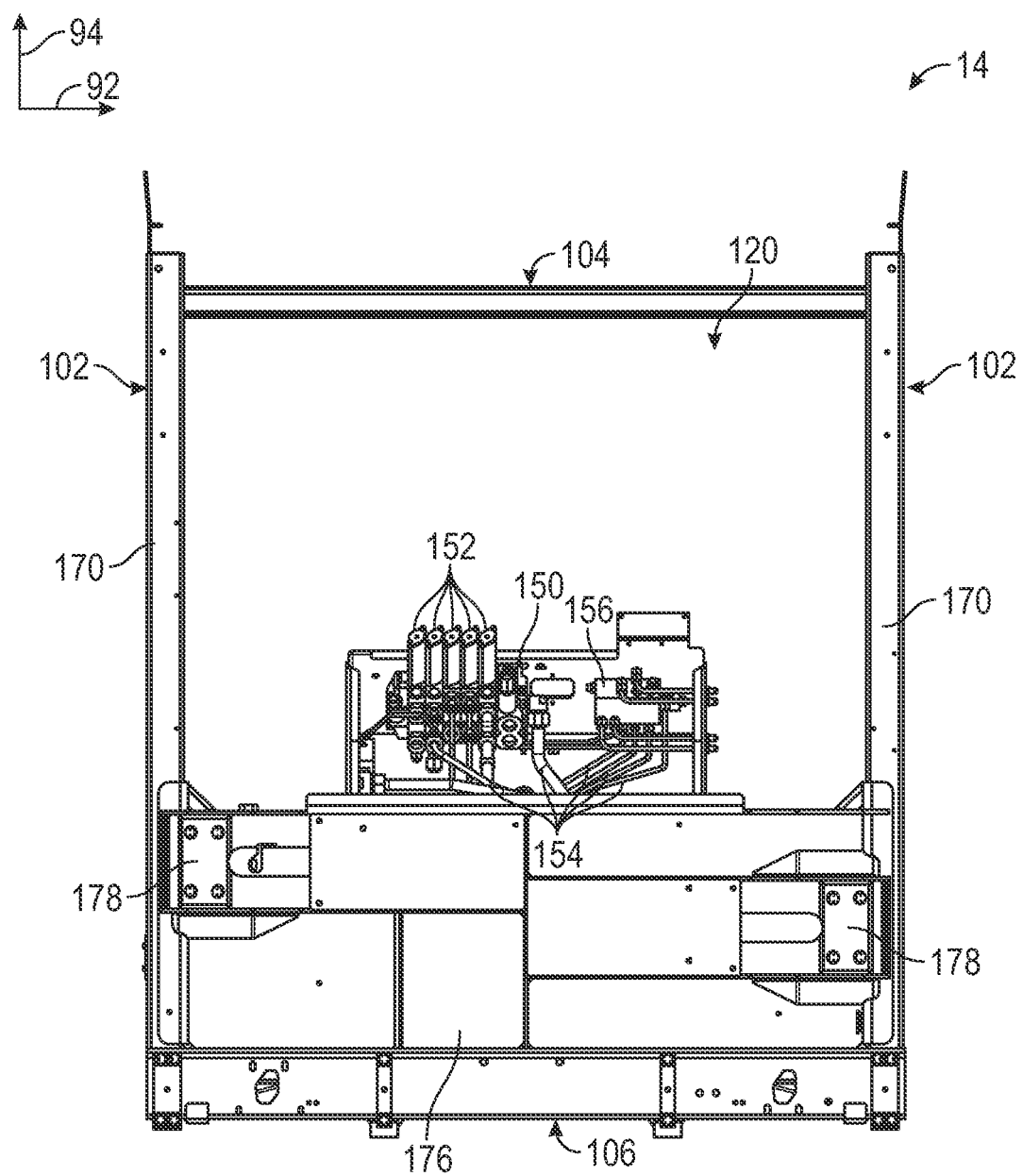
Figure 11:
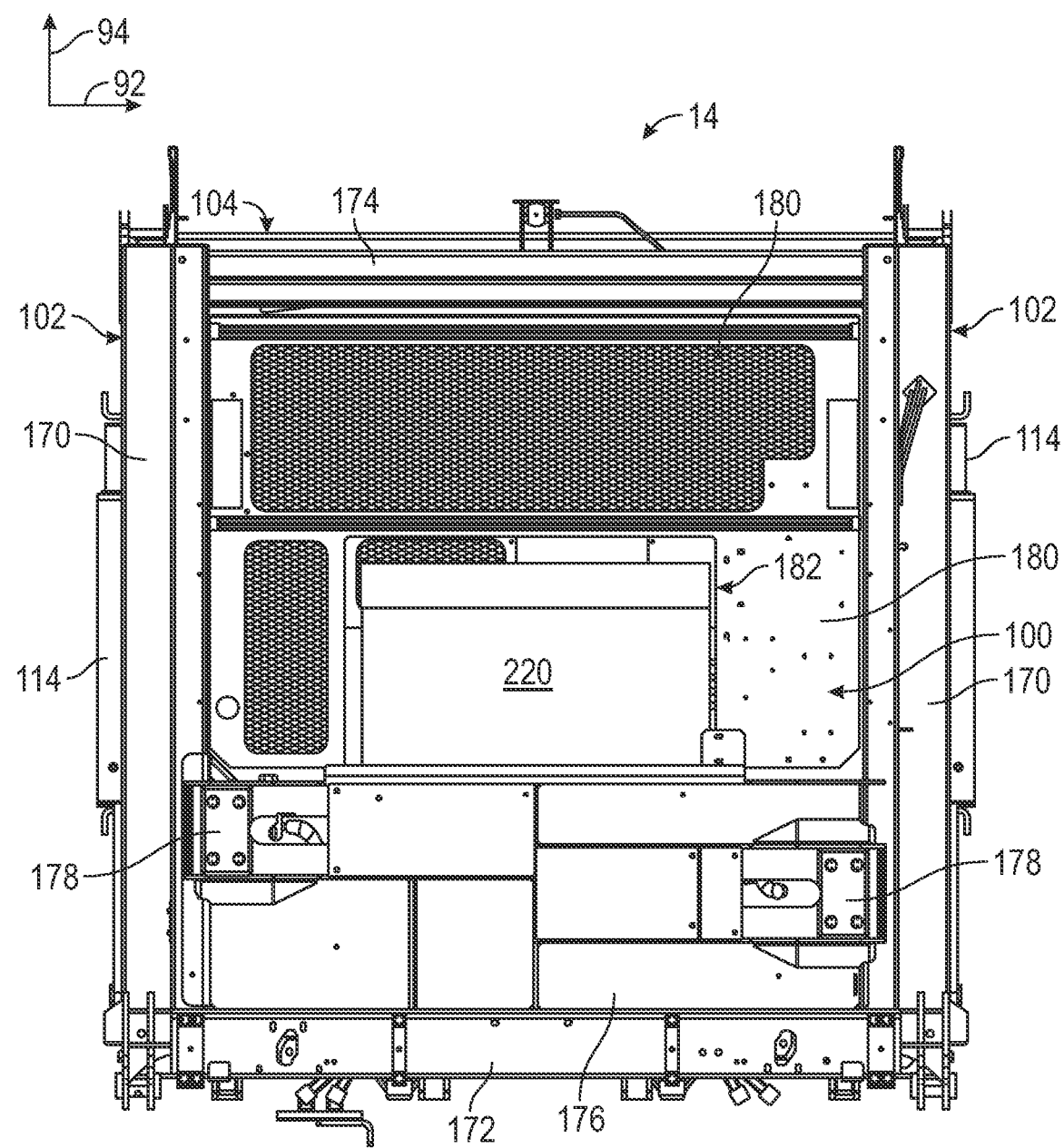
Figure 12:
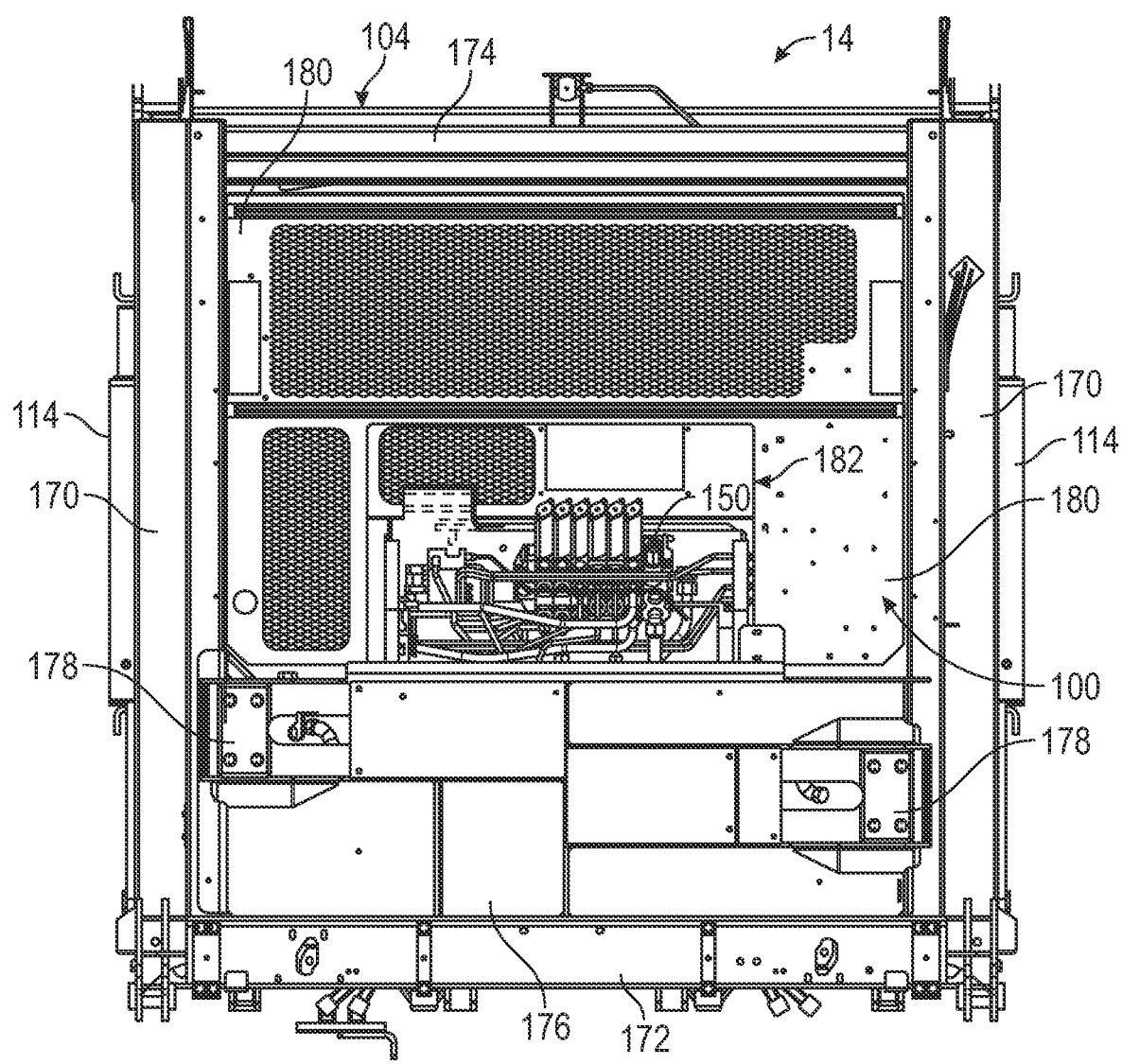

Referring to FIGS. 2, 6, and 7, the refuse vehicle 10 further includes a wall or packer, shown as ejector 130, positioned within the refuse compartment 120. The ejector 130 is slidably coupled to one or more of a side wall 102, the top wall 104, and the bottom wall 106 such that the ejector 130 is movable longitudinally throughout the refuse compartment 120. A pair of fourth actuators, shown as ejector actuators 132, are coupled to the front wall 100 and the ejector 130. The ejector actuators 132 extend and retract to move the ejector 130 longitudinally throughout the refuse compartment 120 between a retracted position and an extended position. In the retracted position, shown in FIG. 6, the ejector 130 is positioned near or proximate the front wall 100. In the extended position, the ejector 130 is moved longitudinally away from the front wall 100 toward the rear end 110.

Referring to FIGS. 6 and 7, the ejector 130 includes a frame 134 and a series of panels 136 coupled to the frame 134. Each of the panels 136 defines a refuse engagement surface configured to engage refuse within the refuse compartment 120 when the ejector 130 moves toward the extended position. Each of the panels 136 is angled relative to one another about the lateral axis 92. The ejector 130 is sized such that the refuse engagement surfaces collectively extend substantially across the entirety of the hopper volume 122 in the vertical and lateral directions. The frame 134 and the panels 136 define a chamber, shown as ejector cavity 138, therebetween that is positioned below, behind, and within the ejector 130. In alternative embodiments, two or more of the panels 136 are formed from a single sheet of material that is bent to facilitate relative orientation of the refuse engagement surfaces. In yet other embodiments, the refuse vehicle 10 includes a different type of ejector (e.g., a two-piece ejector including multiple sections that can be moved independent of one another, etc.).

During operation of the refuse vehicle 10, loose refuse may be placed into the refuse compartment 120 where it may thereafter be compacted. The refuse compartment 120 may provide temporary storage for refuse during transport to a waste disposal site and/or a recycling facility. Refuse may initially be located in a refuse container placed by a customer. An operator may drive the refuse vehicle 10 to a location where the refuse container is located (e.g., a residence, a storefront, a factory, etc.). The operator may then bring the lift assembly 40 into the lowered position and steer the refuse vehicle 10 such that the forks 62 engage the refuse container. The operator may then bring the lift assembly into the raised position. In the raised position, refuse from the refuse container falls into the hopper volume 122 through the hopper opening 126. The operator may control the articulation actuators 64 to shake the refuse container and release any stuck refuse. The operator may then bring the lift assembly 40 into the lowered position and release the refuse container in preparation for engaging another refuse container. Once a sufficient amount of refuse has been loaded into the hopper volume 122, the operator may move the ejector 130 into a packing position between the retracted and extended positions. By moving into the packing position, the ejector 130 forces the refuse contained in the hopper volume 122 into the storage volume 124. If a sufficient amount of refuse is present in the storage volume 124, the ejector 130 may compress or compact the refuse. When the operator desires to empty the refuse from the refuse compartment 120, the operator may move the tailgate 112 to the open position, permitting refuse to exit the storage volume 124. The operator may then move the ejector 130 to the extended position, forcing the refuse out of the refuse compartment 120.

In the embodiment shown in FIGS. 1, 2, and 6, the lift arm actuators 46, the articulation actuators 64, the tailgate actuators 114, and the ejector actuators 132 are hydraulic cylinders. Accordingly, these actuators are linear actuators that extend and retract in response to receiving high-pressure hydraulic fluid. By way of example, each hydraulic cylinder may include an extension chamber and a retraction chamber, where the hydraulic cylinder extends when high-pressure hydraulic fluid is provided to the extension chamber and the hydraulic cylinder retracts when high-pressure hydraulic fluid is provided to the retraction chamber. As shown in FIG. 1, the refuse vehicle 10 includes a pump, shown as hydraulic pump 140, that receives hydraulic fluid from a low-pressure source (e.g., a tank, etc.) and provides a supply of high-pressure hydraulic fluid. In the embodiment shown in FIG. 1, the hydraulic pump 140 is coupled to the engine 18 such that the engine 18 provides mechanical energy to the hydraulic pump 140.

Referring to FIGS. 6-10, the refuse vehicle 10 further includes a valve assembly, shown as valve block 150, that controls the flow of hydraulic fluid between the hydraulic pump 140 to the lift arm actuators 46, the articulation actuators 64, the tailgate actuators 114, and the ejector actuators 132. Accordingly, the valve block 150 controls the operation of the lift assembly 40, the tailgate 112, and the ejector 130. The valve block 150 includes a plurality of valves 152 coupled together. Each valve 152 controls the flow of hydraulic fluid to or from one or more of the actuators. By way of example, a valve 152 may control the flow of hydraulic fluid to both of the lift arm actuators 46. By way of another example, the flow of hydraulic fluid to each of the lift arm actuators 46 may be controlled by a separate valve 152. The valves 152 may be any type of valve (e.g., ball valves, spool valves, etc.). The valves 152 may controlled directly by an operator, by an operator through a controller, or autonomously by a controller. The valves 152 may be mechanically actuated (e.g., through a lever), electrically actuated (e.g., through a solenoid), actuated by a pilot (e.g., a pneumatic or hydraulic pilot), or otherwise actuated. The valves 152 may facilitate variable control over the flow of hydraulic fluid (e.g., to vary the speed of each actuator, etc.), or the valves 152 may be solely opened or closed. Each valve 152 is fluidly coupled (directly or indirectly) to one of the actuators and the hydraulic pump 140 through one or more conduits or hoses, shown as tubes 154. A secondary valve assembly, shown as valve block 156, is also fluidly coupled to the valve block 150. The valve block 156 may include one or more flow control components, such as check valves, flow control valves, pressure relief valves, etc.

In an alternative embodiment, the refuse vehicle 10 additionally or alternatively utilizes a pneumatic system that uses air or another compressed gas as the working fluid instead of hydraulic fluid. By way of example, the hydraulic pump 140 may instead be a compressor that pressurizes air from the surrounding atmosphere. The valve block 150 may instead include pneumatic valves configured to control the flow of compressed gas to the various actuators.

Referring to FIGS. 3 and 11-13, the front wall 100 is shown according to an exemplary embodiment. The front wall 100 includes a pair of first frame members, shown as vertical members 170, extending vertically. The side walls 102 are directly coupled to the vertical members 170. A second frame member, shown as bottom member 172, extends laterally between and couples directly to the vertical members 170 at the bottom of the front wall 100. The bottom wall 106 couples directly to the bottom member 172. A third frame member, shown as top member 174, extends laterally between and couples directly to the vertical members 170 at the top of the front wall 100. A first panel, shown as ejector coupling panel 176, extends between the vertical members 170 adjacent the bottom member 172. The ejector coupling panel 176 defines a pair of actuator interfaces 178 each configured to pivotally couple to one of the ejector actuators 132. A series of second panels, shown as panels 180, extend between the vertical members 170 above the ejector coupling panel 176. The ejector coupling panel 176 and the panels 180 define an opening or aperture, shown as access aperture 182, therebetween. The access aperture 182 is positioned near the center of the front wall 100 and extends adjacent the valve block 150.

Figure 13:
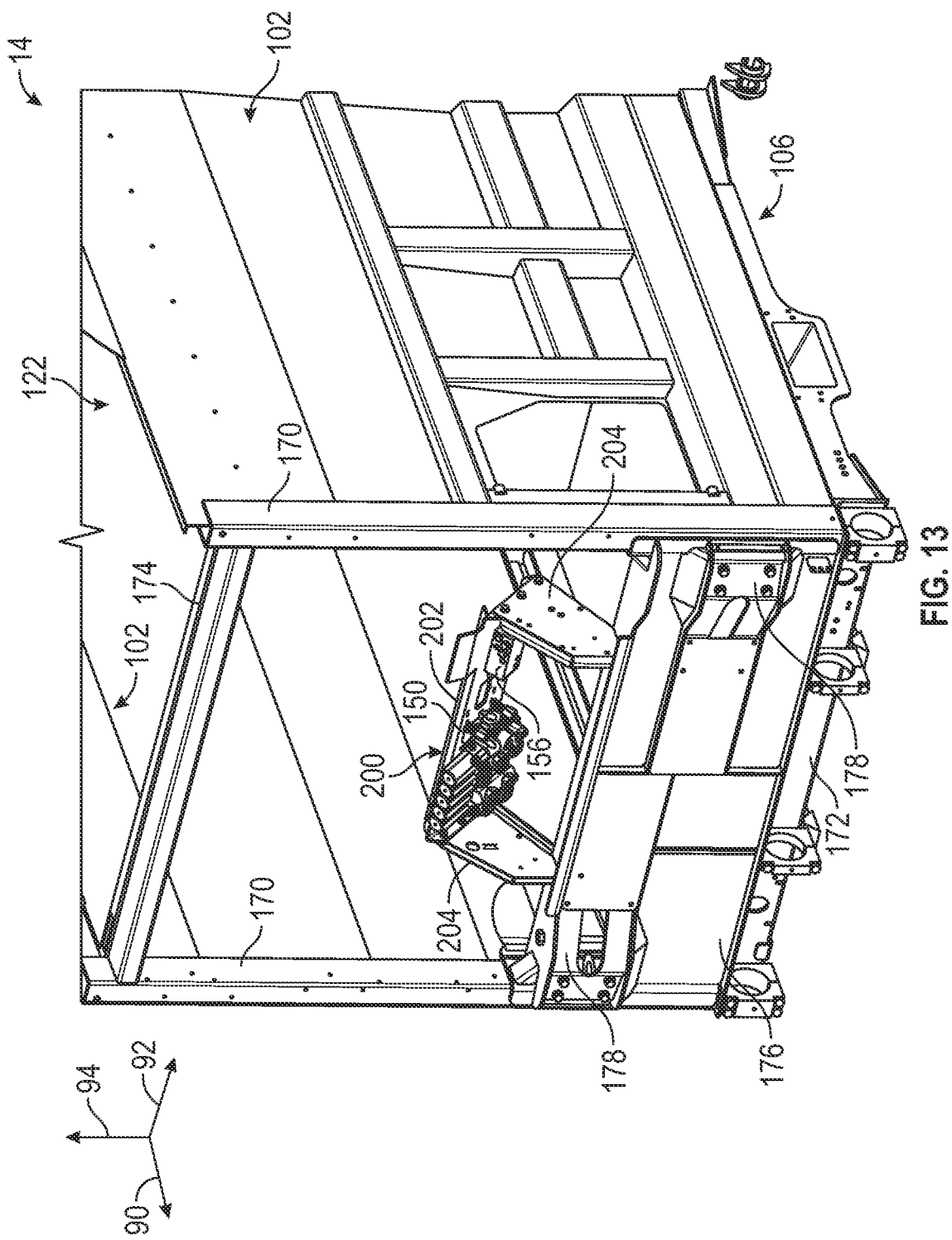
Figure 14:
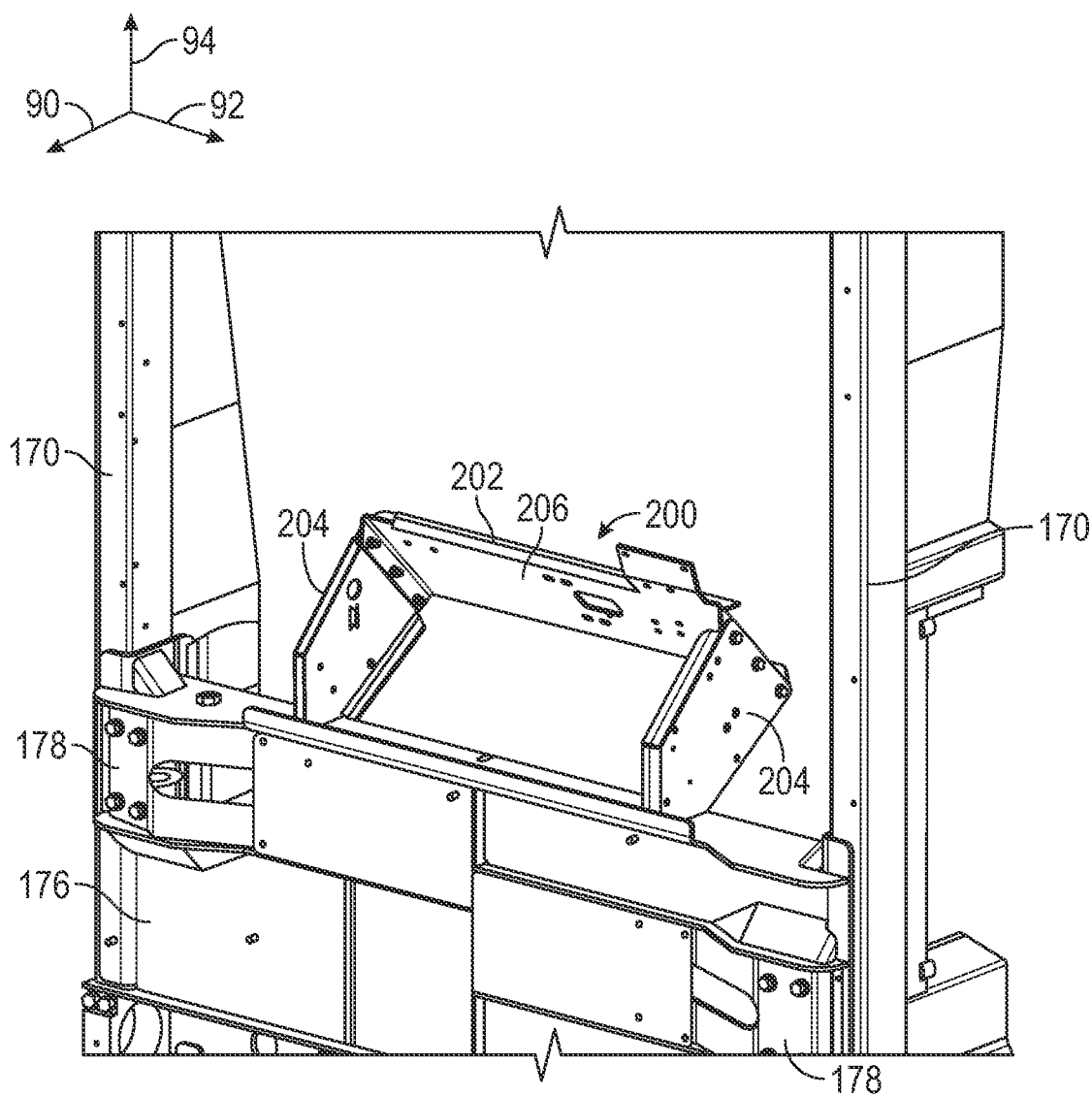

Referring to FIGS. 13 and 14, the body 14 includes a mounting bracket or mounting bracket assembly, shown as bracket 200, that couples the valve block 150 to the front wall 100. The bracket 200 includes a first member, portion, or bracket, shown as plate 202, and a pair of second members, portions, brackets, plates, or arms, shown as side walls 204. Each side wall 204 is coupled (e.g., fastened, welded, etc.) to a top edge of the ejector coupling panel 176. From the ejector coupling panel 176, the side walls 204 each extend vertically upward and longitudinally rearward of the access aperture 182 (e.g., into the ejector cavity 138, etc.). The side walls 204 both extend substantially perpendicular to the lateral axis 92. The side walls 204 are each coupled (e.g., fastened, welded, etc.) to an end of the plate 202.

Figure 15:
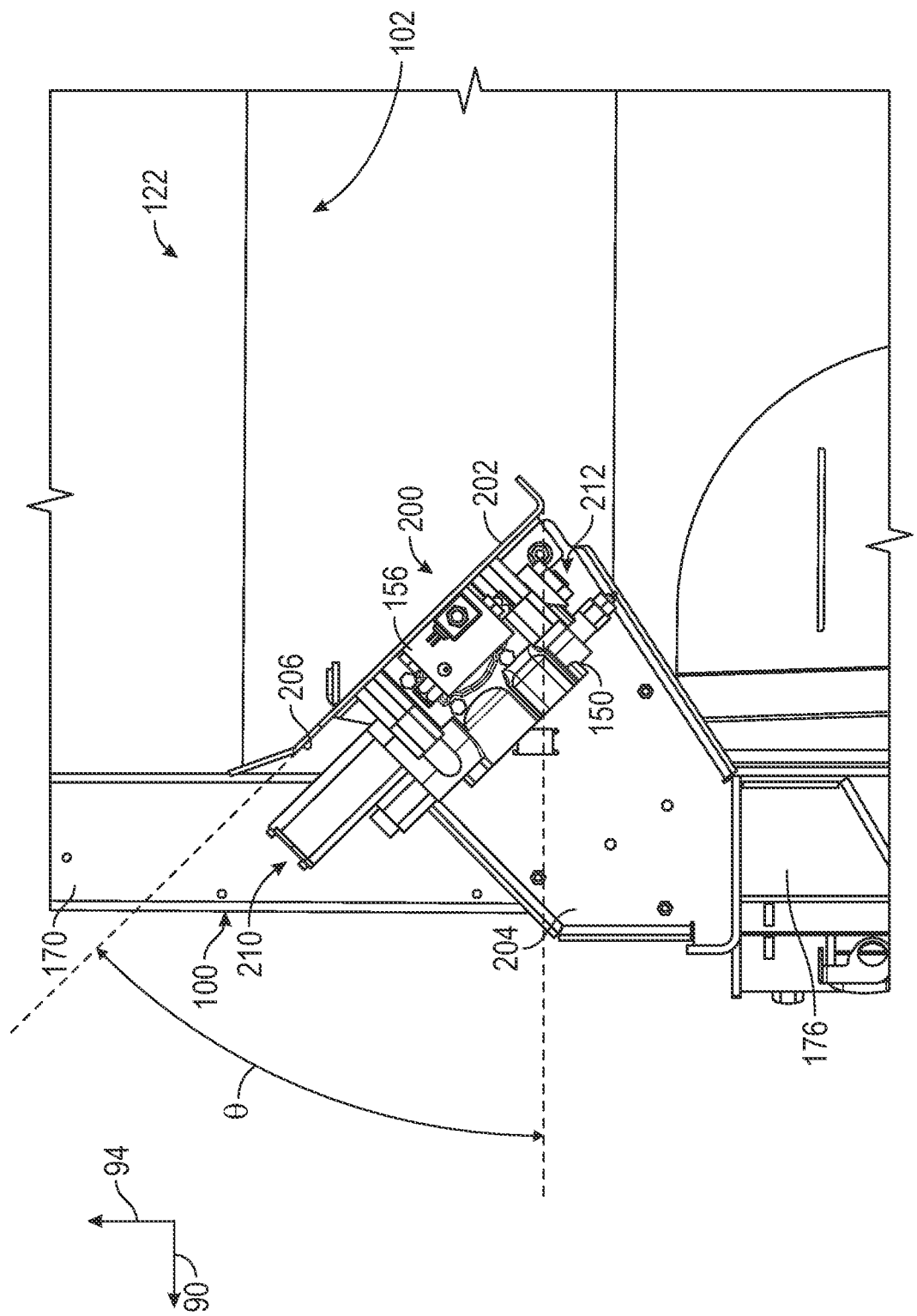
FIG. 15 is a side section view of the body assembly of FIG. 2 showing an orientation of the valve assembly of FIG. 8.
Figure 16:
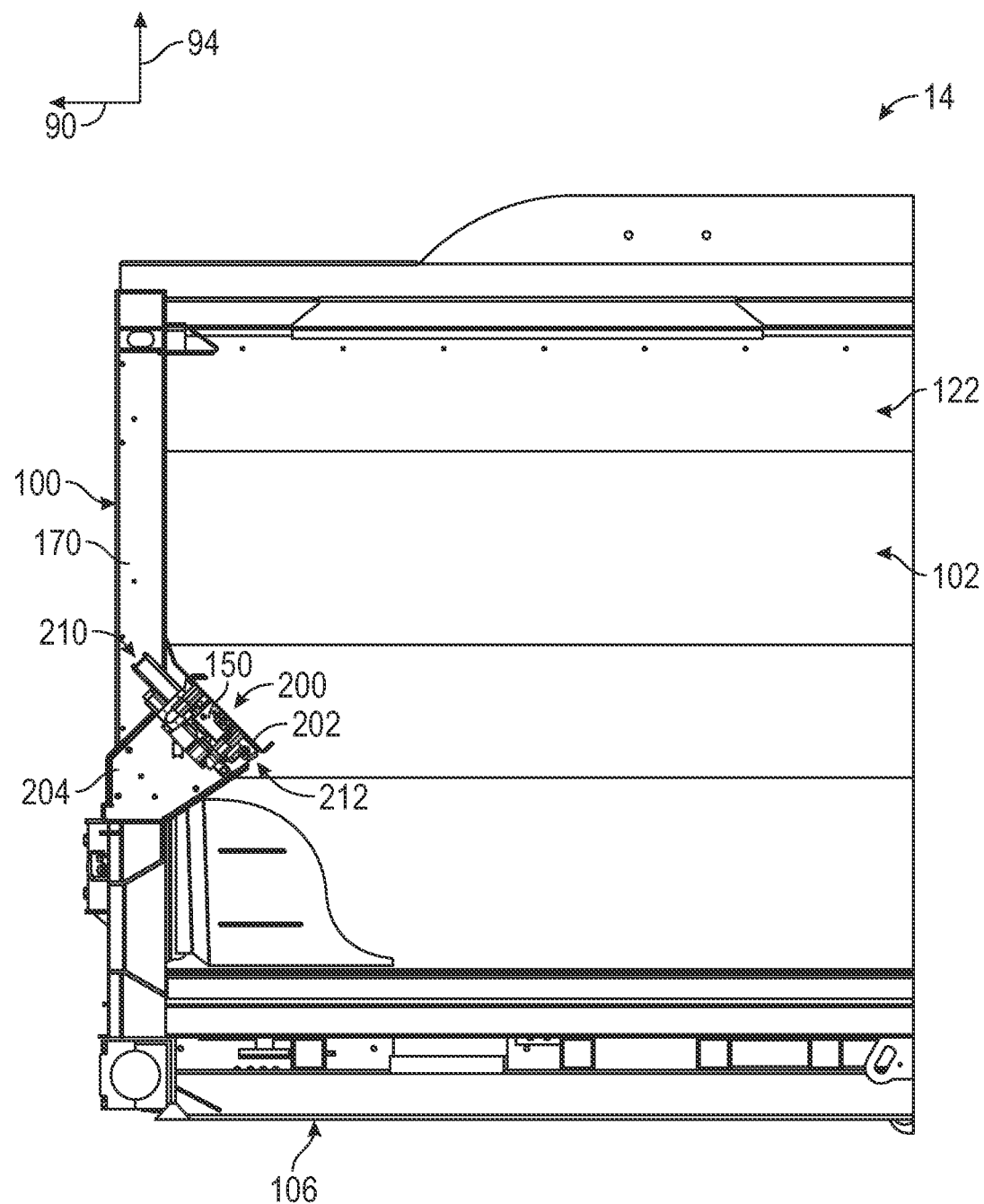
FIG. 16 is a side section view of the body assembly of FIG. 2.
Figure 17:
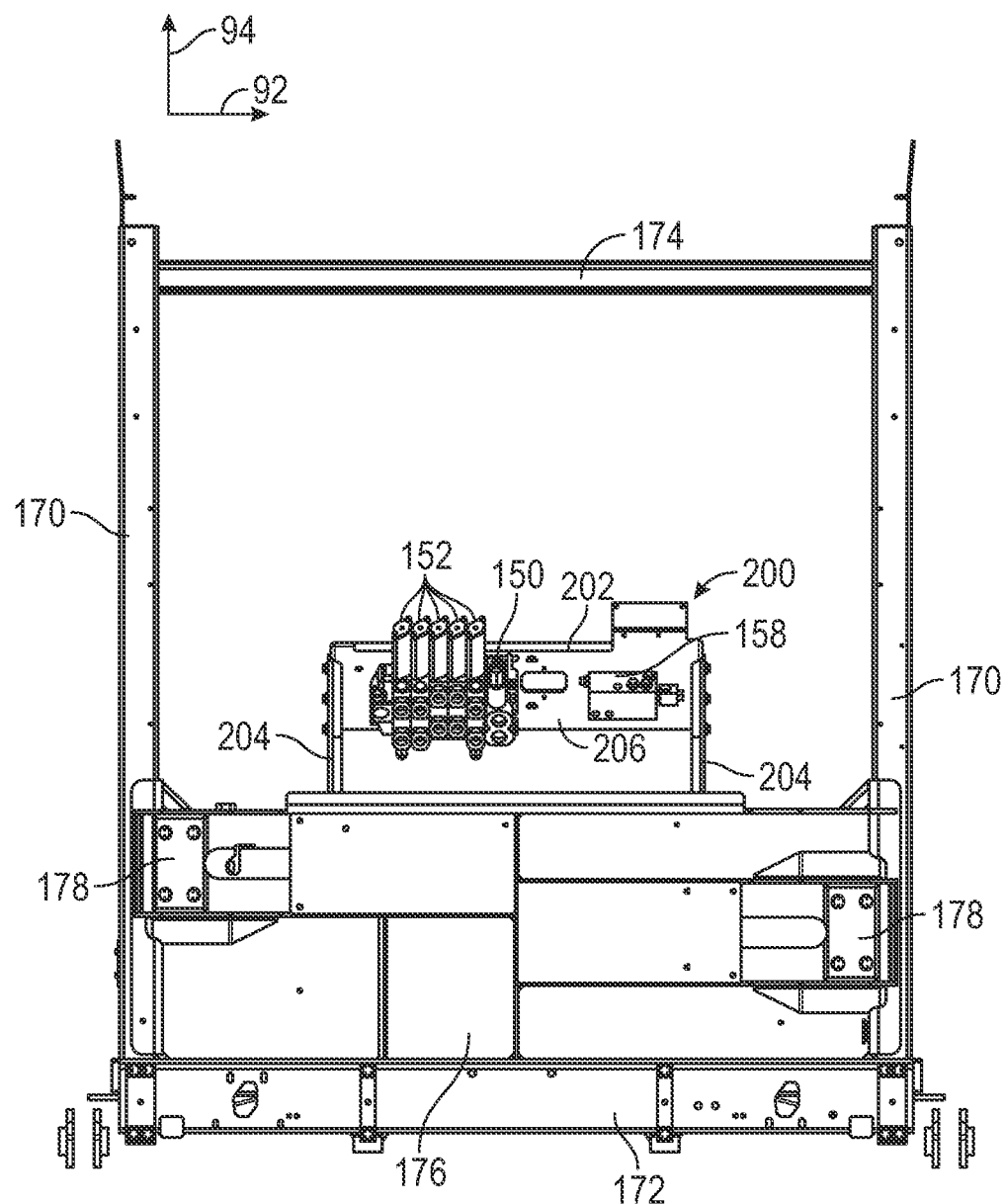
FIG. 17 is a front view of the body assembly of FIG. 2.
Figure 18:
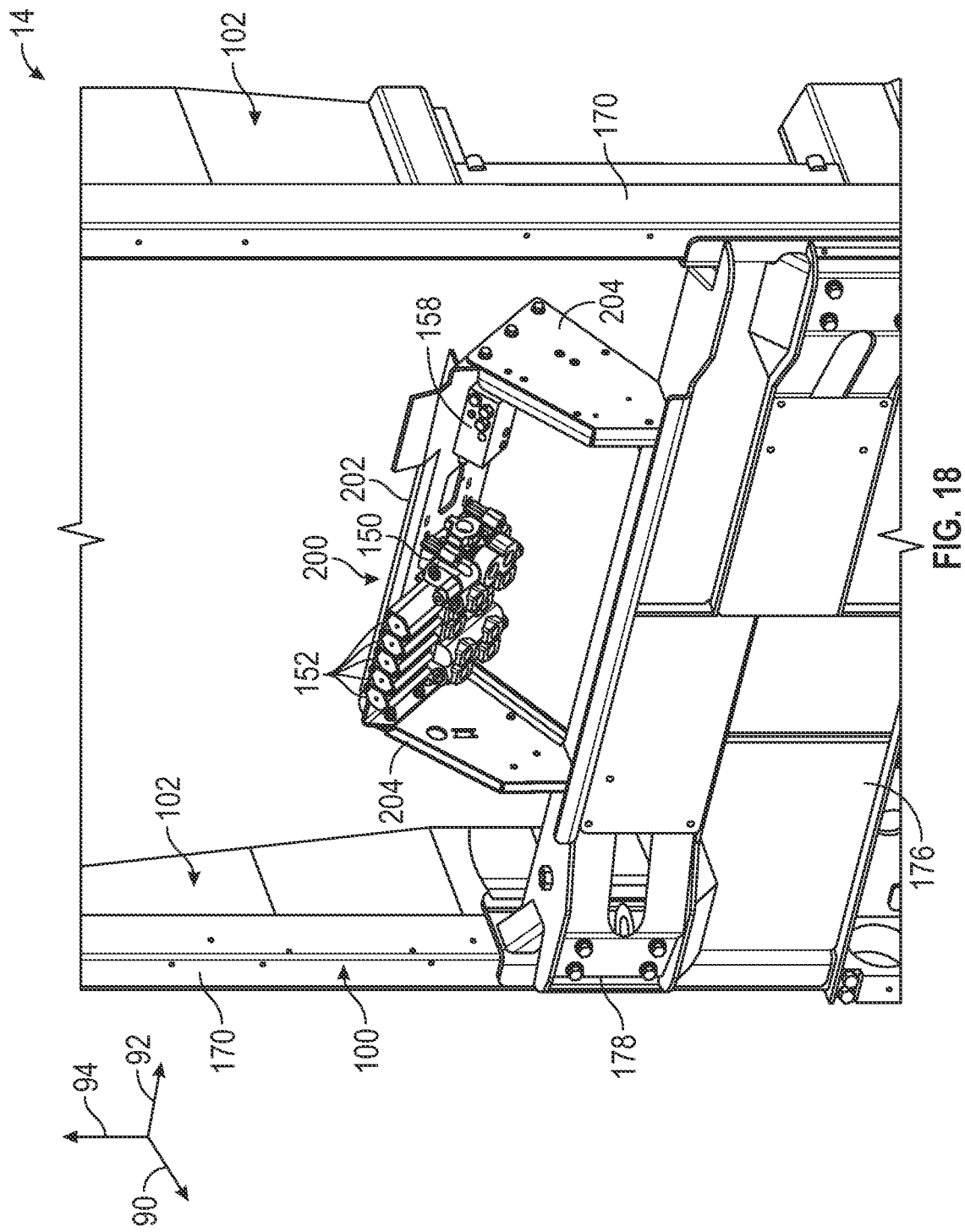
FIG. 18 is a perspective view of the body assembly of FIG. 2.
Figure 19:
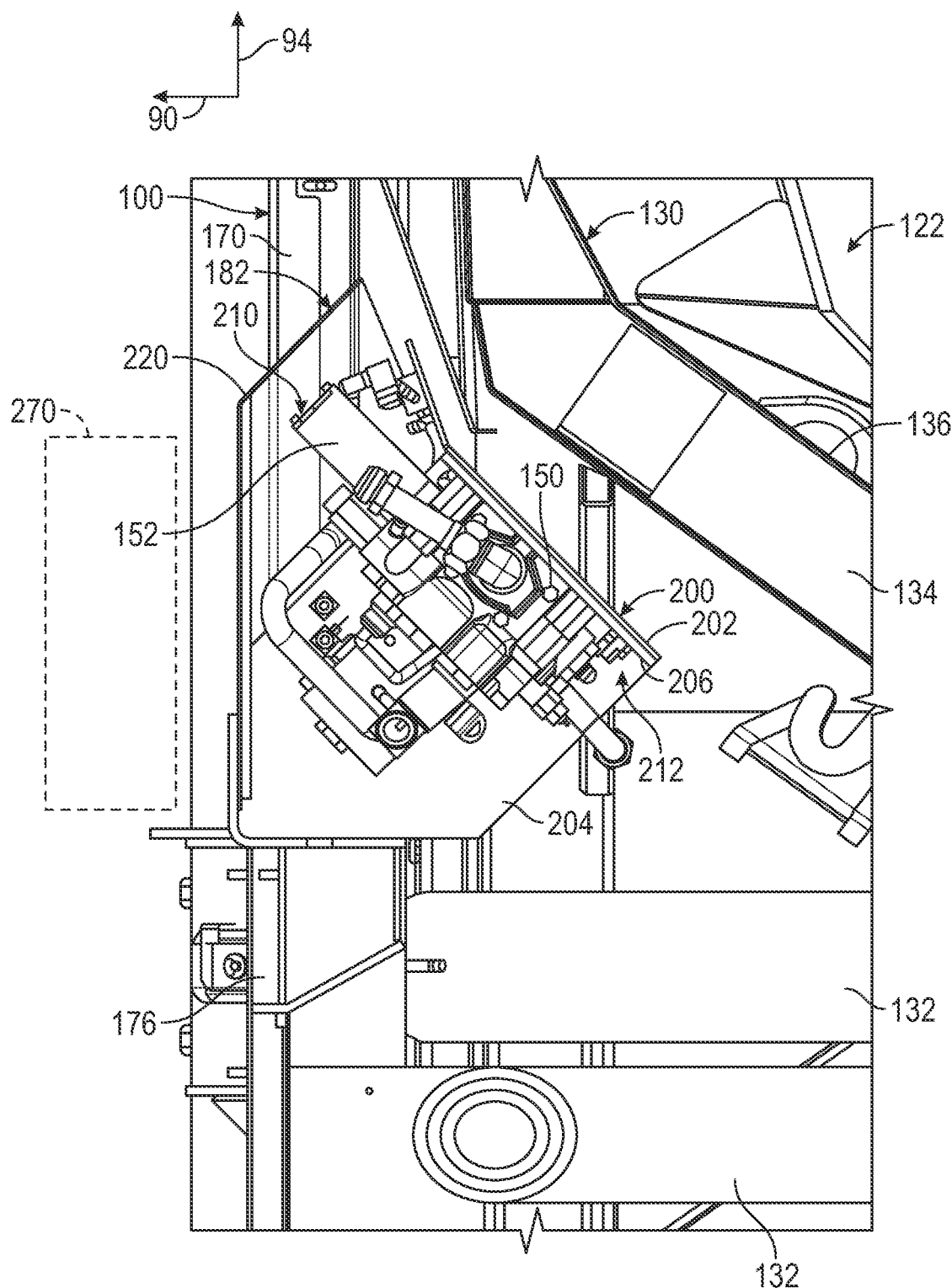
FIGS. 19-23 are side section views of the body assembly of FIG. 2.
Figure 20:
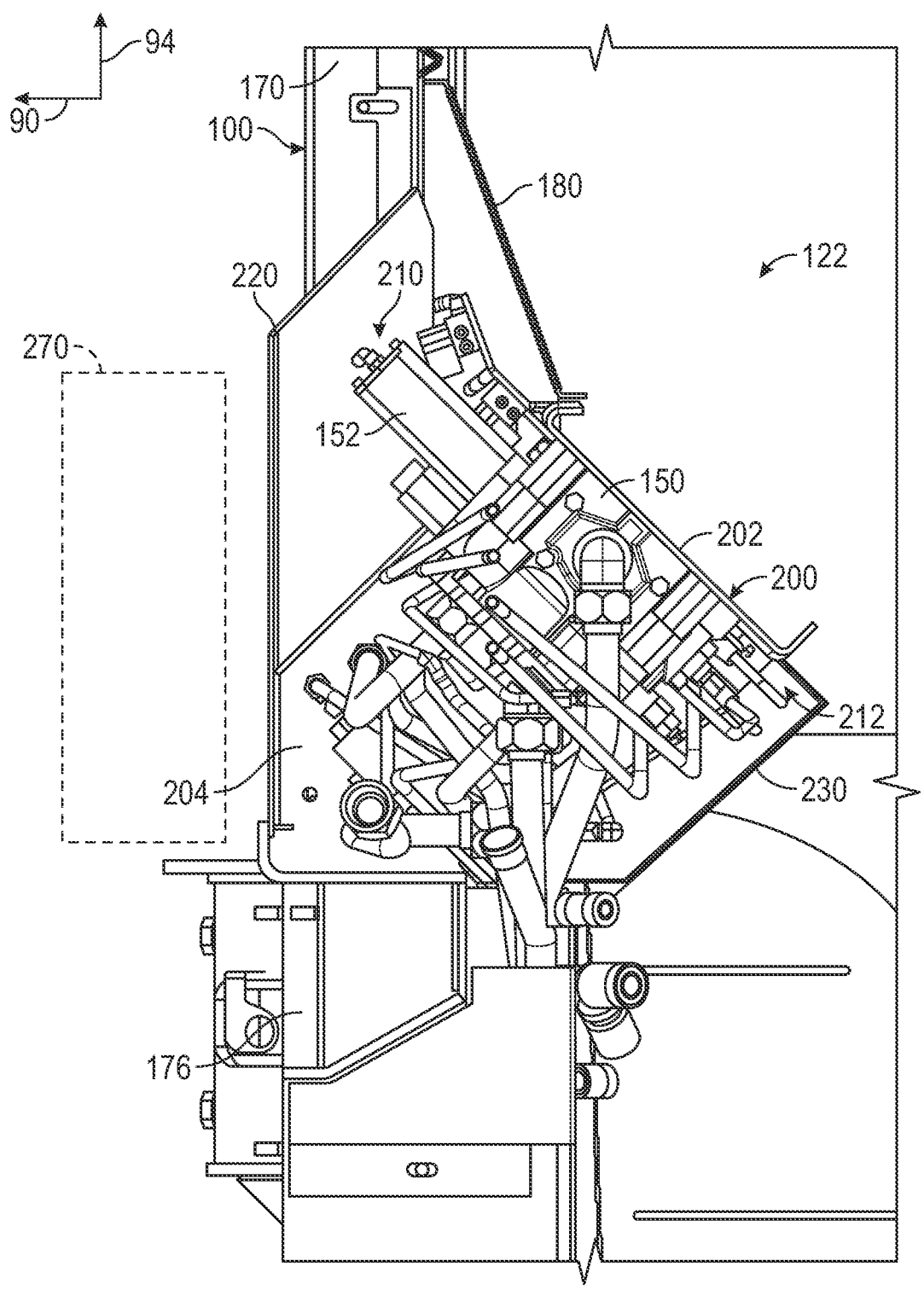

Referring to FIGS. 13-20, the plate 202 defines a surface, shown as support surface 206, to which the valve block 150 and the valve block 156 are directly coupled. In some embodiments, the support surface 206 is a flat surface. The support surface 206 extends along the lateral axis 92. The support surface 206 is oriented between horizontal and vertical. As shown in FIG. 15, the support surface 206 is oriented at an angle θ relative to a horizontal plane. In the embodiment shown in FIG. 15, the angle θ is approximately 45 degrees. In other embodiments, the angle θ is another angle between 0 and 90 degrees (e.g., 15, 30, 40, 50, 60, 75, etc.), between 90 and 180 degrees, between 180 and 270 degrees, or between 270 and 360 degrees. In yet other embodiments, the angle θ is equal to 0, 90, 180, or 270 degrees and the support surface 206 is horizontal or vertical. As shown in FIG. 15, the valve block 150 faces forward and downward. In other embodiments, the valve block 150 faces rearward and/or upward. The valve block 150 has two ends: a first end 210 and a second end 212. The valve block 150 is oriented between vertical and horizontal. Accordingly, the first end 210 and the second end 212 are offset from one another both vertically and longitudinally. Specifically, the first end 210 is offset vertically above and longitudinally forward from the second end 212. As shown in FIGS. 15 and 20, the plate 202, the side walls 204, and the second end 212 of the valve block 150 extend longitudinally rearward of the front wall 100. The first end 210 of the valve block 150 does not extend rearward of the front wall 100 (e.g., the vertical members 170 and the panel 180 extend both longitudinally rearward of the first end 210). In some embodiments, the first end 210 extends rearward of the front wall 100.

Referring to FIGS. 6 and 21-23, the orientation of the valve block 150 and the plate 202 facilitates extending the bracket 200 and the valve block 150 into the hopper volume 122 and the ejector cavity 138. In FIGS. 6 and 21-23, the ejector 130 is in the retracted position. Accordingly, the ejector 130 is as close to the front wall 100 as it can be during normal operation. In this configuration, the bracket 200, the second end 212 of the valve block 150, and the valve block 156 all extend into the ejector cavity 138 and directly below the frame 134 of the ejector 130. The valve block 150 and the plate 202 are oriented nearly parallel (e.g., 10 degrees off of parallel, 5 degrees off of parallel, etc.) to the nearest portion of the frame 134. Accordingly, the second end 212 of the valve block 150 can extend longitudinally into the ejector cavity 138 without the plate 202 or the first end 210 of the valve block 150 interfering with the movement of the ejector 130.

Figure 23:
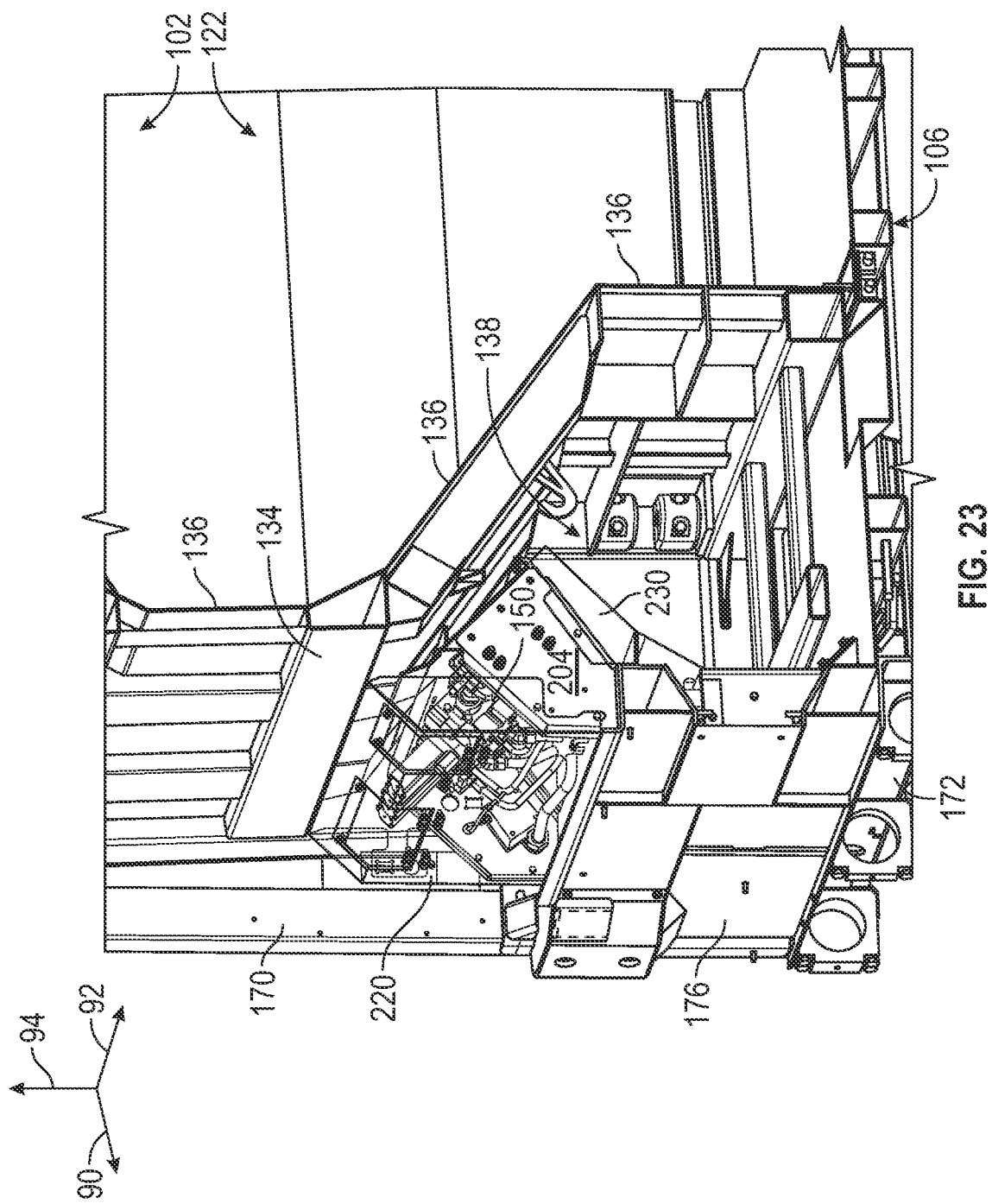
Figure 24:
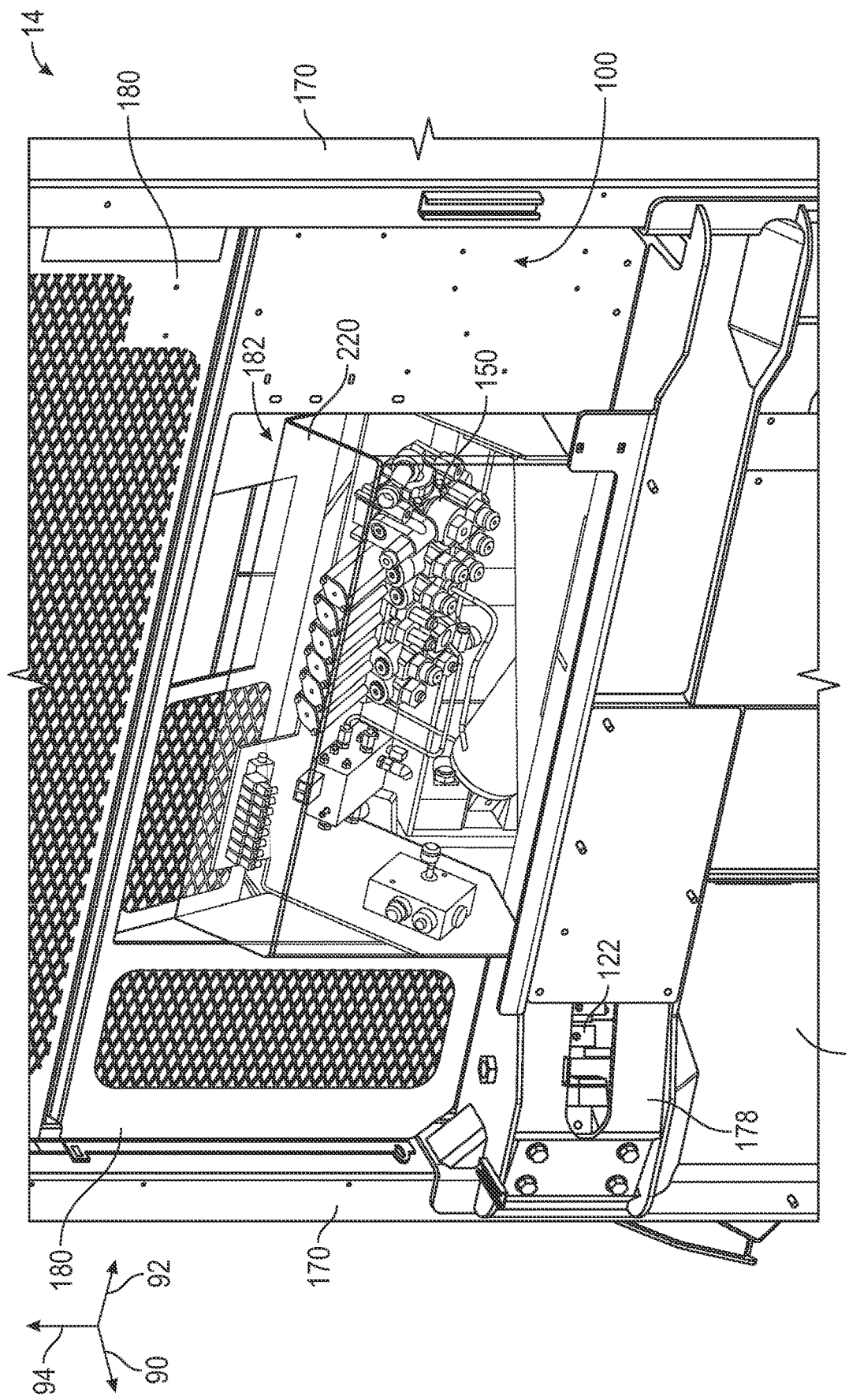
FIG. 24 is a perspective view of the body assembly of FIG. 2.

Referring to FIGS. 19, 23, and 24, the body 14 further includes a first sheet or cover, shown as front cover 220. The front cover 220 is coupled to the side walls 204. The front cover 220 extends across the access aperture 182. The front cover 220 extends longitudinally forward of the valve block 150 and the plate 202. The front cover 220 substantially obscures the valve block 150, the valve block 156, and the tubes 154 from view of an observer positioned directly in front of the front wall 100.

Figure 21:
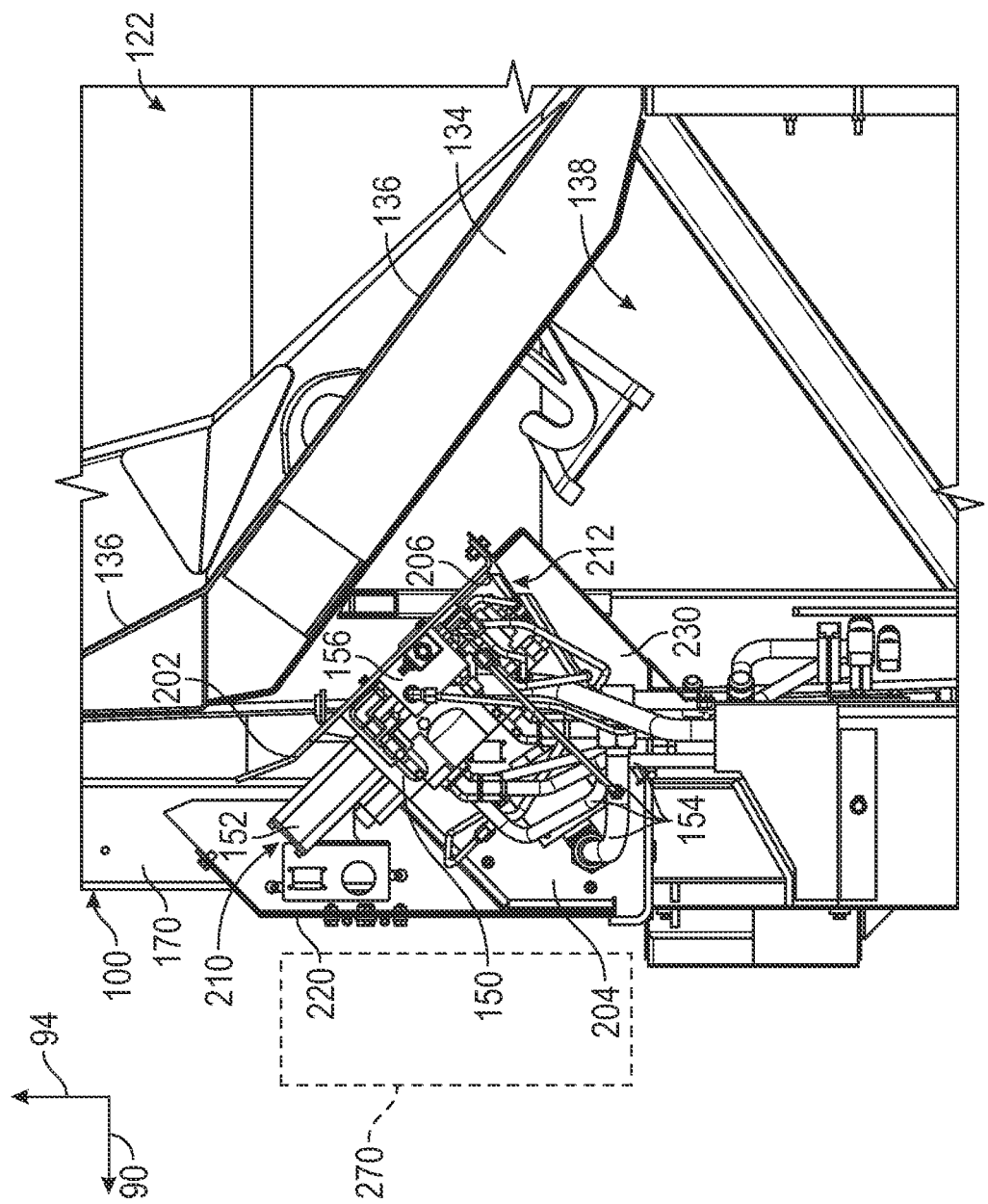
Figure 22:
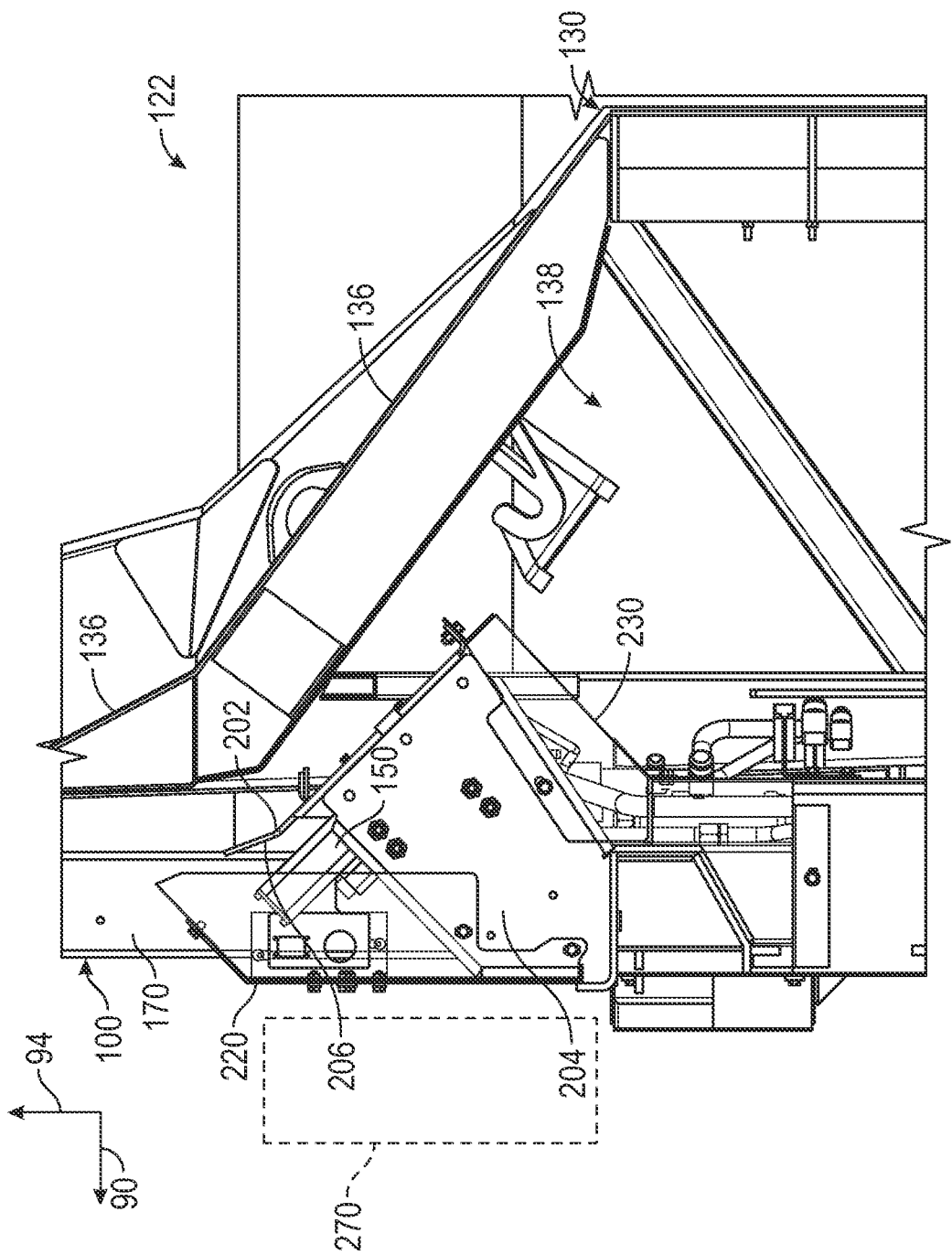
Figure 25:
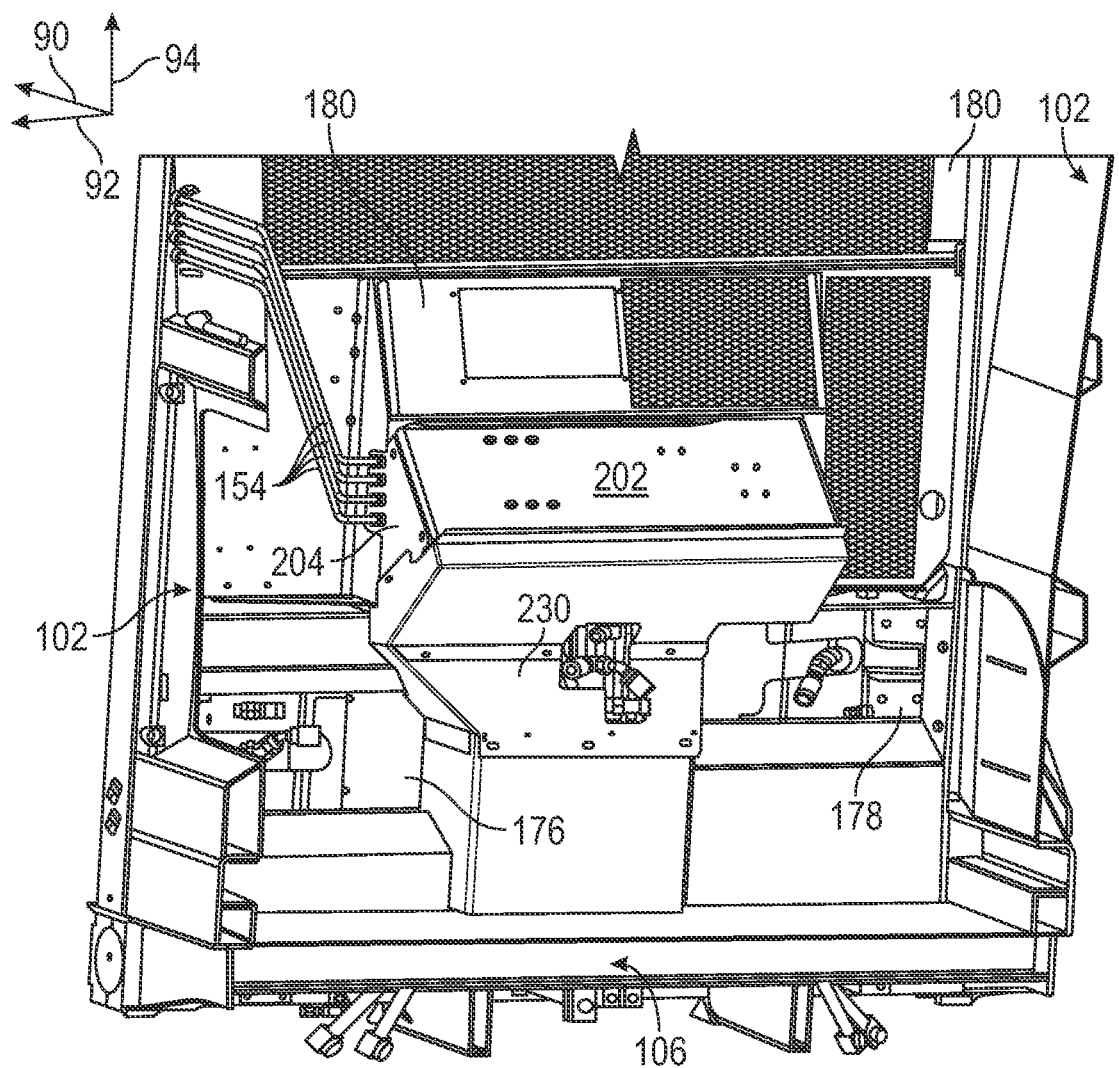
FIGS. 25 and 26 are rear perspective section views of the body assembly of FIG. 2.
Figure 26:
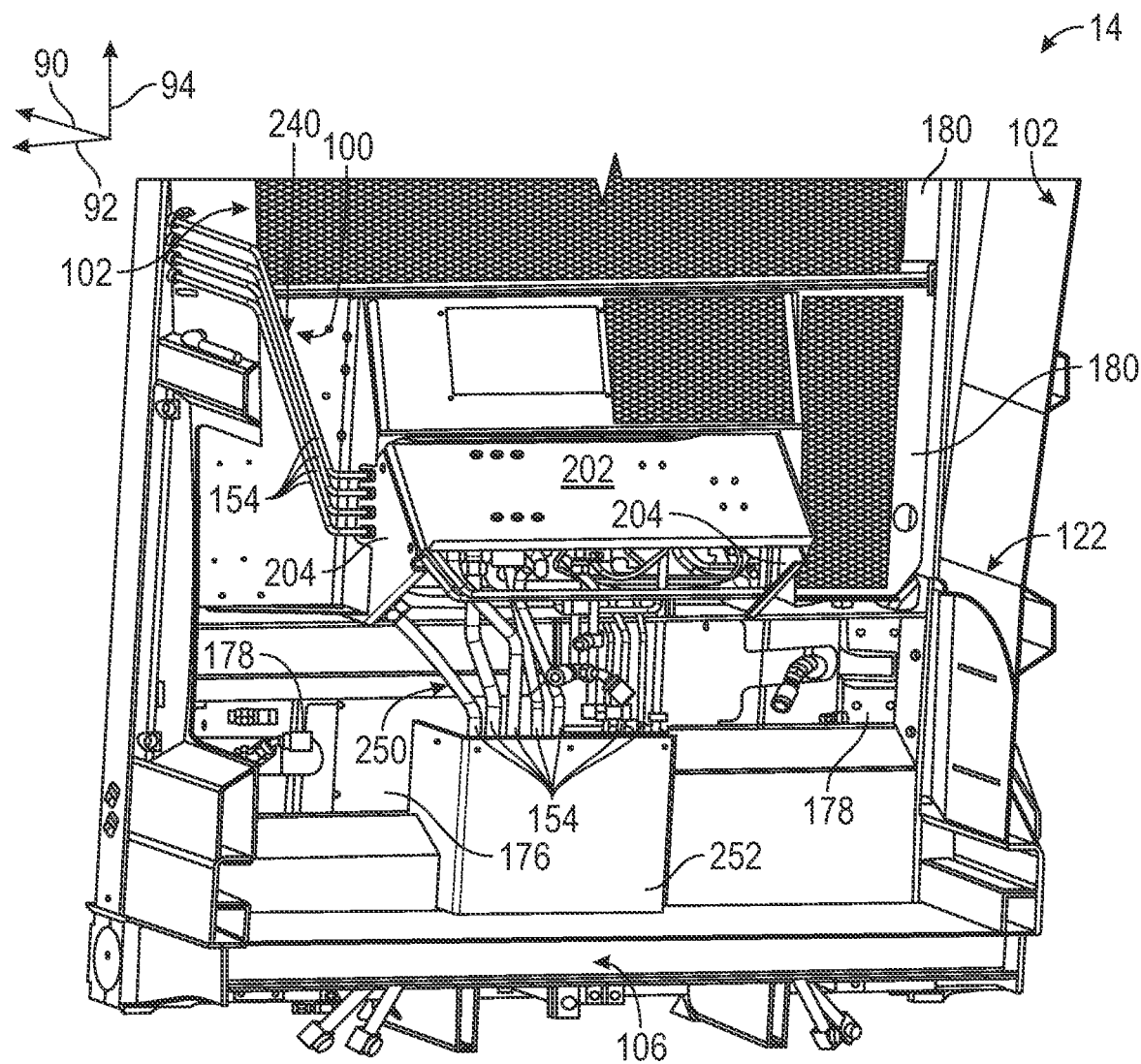

Referring to FIGS. 21, 25, and 26, the body 14 further includes a second sheet or cover, shown as rear cover or back cover 230. The back cover 230 is coupled to the side walls 204. The back cover 230 extends between the plate 202, the side walls 204, and the front wall 100. The back cover 230 extends longitudinally rearward of the valve block 150. The back cover 230 substantially obscures the valve block 150, the valve block 156, and the tubes 154 from view of an observer positioned within the hopper volume 122. The front cover 220 and the back cover 230 are selectively removable (e.g., by removing fasteners, etc.) to facilitate maintenance of the valve block 150, the valve block 156, and the tubes 154.

Referring to FIGS. 4, 5, 25, and 26, the tubes 154 extend from the valve block 150 along the body 14 to various points within the refuse vehicle 10. A first group 240 of tubes 154 extends laterally through one of the side walls 204 and along an inner surface of one of the panels 180. The first group 240 then extends out of the refuse compartment 120 through one of the side walls 102. The first group 240 extends along an outer surface of the side wall 102 toward the rear end 110. A series of sheets, covers, or ducts, shown as covers 242, cover or surround the first group 240 such that the first group 240 is substantially obscured from view of an observer offset laterally from the body 14. The covers 242 are coupled to the side wall 102. In some embodiments, the first group 240 fluidly couples the valve block 150 to the tailgate actuators 114. A second group 250 of tubes 154 extends vertically downward from the valve block 150. The second group 250 extends along an inner surface of the front wall 100 between the front wall 100, the plate 202, and the side walls 204. The second group 250 extends through a cover or duct, shown as cover 252, that is coupled to the front wall 100. The second group 250 then extends out of the refuse compartment 120 through the bottom wall 106. In some embodiments, the second group 250 fluidly couples the valve block 150 to the lift arm actuators 46 and the articulation actuators 64. Both the first group 240 and the second group 250 extend from the valve block 150 into the refuse compartment 120.

Figure 27:
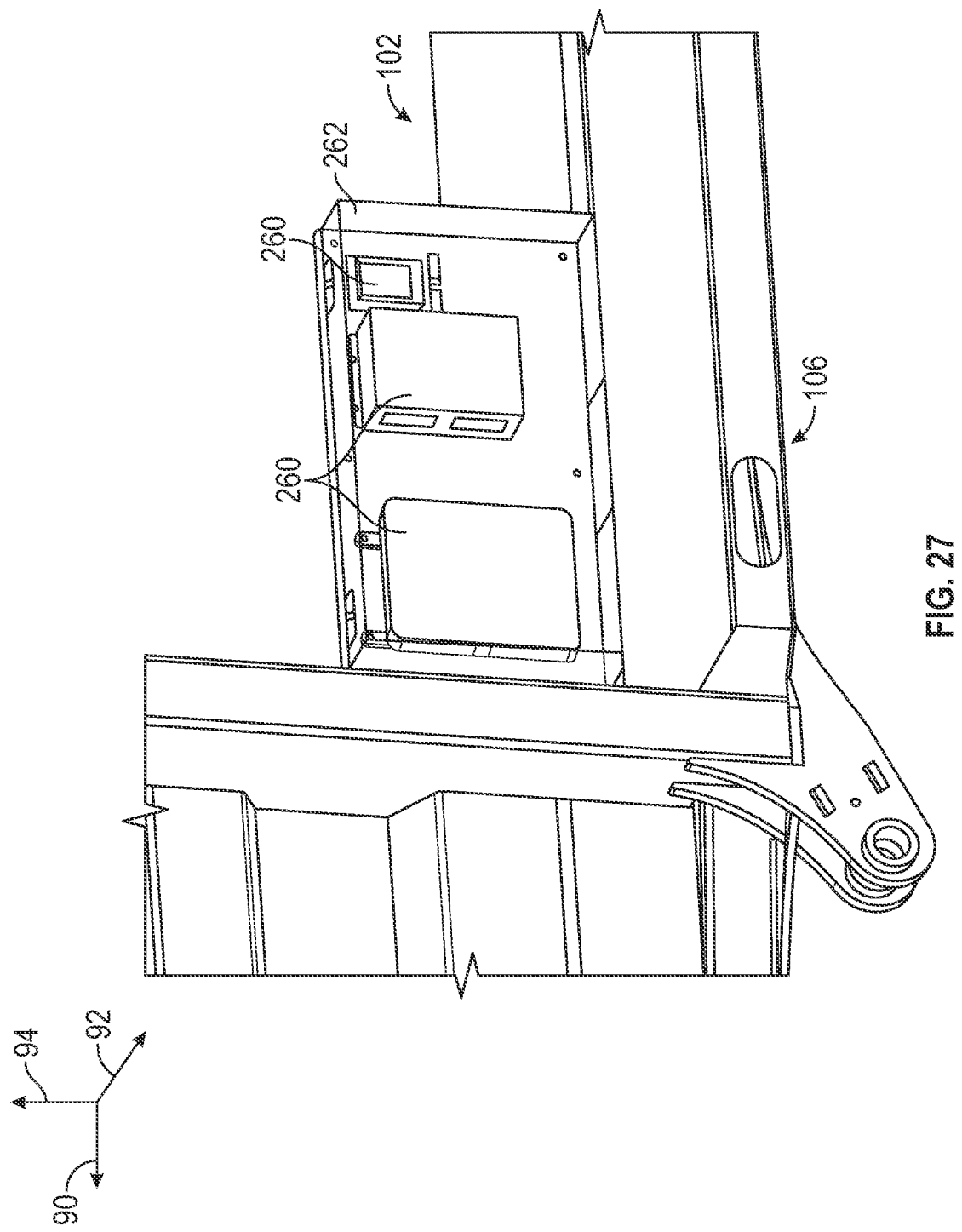
FIG. 27 is a perspective view of control components of the front-loading refuse vehicle of FIG. 1, according to an exemplary embodiment.

In some embodiments, other components are coupled to the exterior of the body 14. Referring to FIG. 27, the refuse vehicle 10 includes control components 260 coupled to an exterior surface of one of the side walls 102. The control components 260 may be electronic components, such as sensors or controllers. Alternatively, the control components 260 may be hydraulic or pneumatic components, such as valves. A sheet, cover, or duct, shown as cover 262, is coupled to the side wall 102 and substantially obscures the control components 260 from view of an observer laterally offset from the body 14.

Referring to FIGS. 1, 6, and 19-22, the refuse vehicle 10 includes an exhaust system 270. In this embodiment, the engine 18 is an internal combustion engine that converts stored energy in the form of fuel to mechanical energy that is used to drive the wheels 20 and the hydraulic pump 140. As a byproduct of this process, the engine 18 produces high-temperature exhaust gasses. The exhaust system 270 is configured to route the exhaust gasses away from the engine 18 and into the surrounding environment. The exhaust system 270 may additionally be configured to remove certain undesirable substances (e.g., carbon monoxide, hydrocarbons, nitric oxide, nitrogen dioxide, etc.) from the exhaust gasses and/or muffle sounds produced by the engine 18. The exhaust system 270 may include conduits (e.g., pipes, hoses, etc.), mufflers, catalytic converters, filters, or other exhaust components. At least a portion of the exhaust system 270 extends directly between the cab 16 and the front wall 100.

In conventional refuse vehicles, a valve block that controls the flows of hydraulic fluid is mounted vertically on the front wall of a body assembly. In such vehicles, a first end of the valve block is positioned directly above a second end of the valve block, and the valve block extends forward of the front wall. Each conduit leaving the valve block extends forward of the front wall, and the valve block and the tubes are exposed to the exhaust system. In certain circumstances, the valve block and/or the tubes leak hydraulic fluid. In this conventional arrangement, the hydraulic fluid may spray onto the exhaust system, which can be very hot during operation, causing the hydraulic fluid to react.

In the refuse vehicle 10 of the present disclosure, the valve block 150 is oriented between horizontal and vertical. This facilitates moving the valve block 150 rearward and beneath the ejector 130 without interfering with the ejector 130. This also facilitates running the tubes 154 inside of the refuse compartment 120, which in turn facilitates placing the front cover 220 in front of the valve block 150. The front cover 220 and the front wall 100 extend directly between (i) the exhaust system 270 and (ii) the valve block 150 and the tubes 154. Accordingly, the valve block 150 and the tubes 154 are physically separated from the exhaust system 270. In the event that the valve block 150 and/or the tubes 154 leak, the front cover 220 and the front wall 100 prevent the hydraulic fluid from reaching the exhaust system 270.

Figure 28:
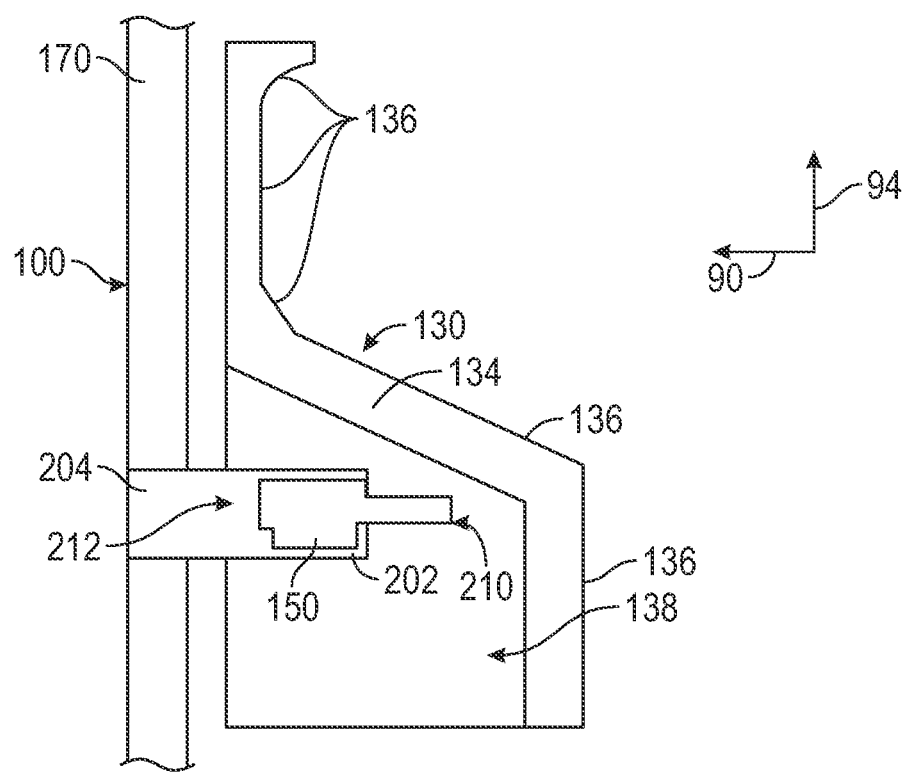
FIG. 28 is a side section view of a body assembly of the front-loading refuse vehicle of FIG. 1, according to another embodiment.
Figure 29:
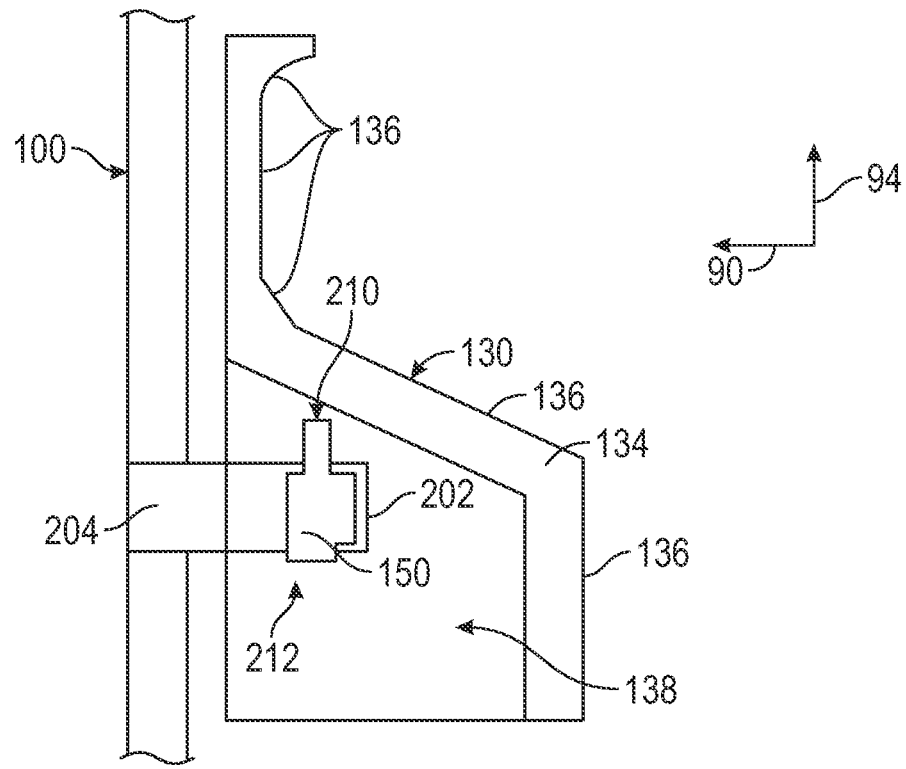
FIG. 29 is a side section view of a body assembly of the front-loading refuse vehicle of FIG. 1, according to yet another embodiment.

In other embodiments, the valve block is otherwise oriented. In the embodiment shown in FIG. 28, the valve block 150 is oriented substantially horizontally (e.g., the angle $\theta$ is equal to 0 degrees or 180 degrees). In such an embodiment, the valve block 150 may (i) extend into the refuse compartment 120 and the ejector cavity 138 and (ii) be positioned directly below the ejector 130, similar to the valve block 150 shown in FIG. 21. In the embodiment shown in FIG. 29, the valve block 150 is oriented substantially vertically (e.g., the angle $\theta$ is equal to 90 degrees or 270 degrees). In such an embodiment, the valve block 150 may (i) extends into refuse compartment 120 and the ejector cavity 138 and (ii) be positioned directly below the ejector 130. In such an embodiment, the valve block 150 may be lowered relative to the valve block 150 shown in FIG. 21 to prevent interference between the valve block 150 and the ejector 130.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the refuse vehicle 10 and the valve block 150 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse body assembly for a refuse vehicle, the refuse body assembly comprising:
    a body defining a compartment, the body including a bottom wall defining a horizontal plane and a front wall defining a vertical plane;
    a bracket having an arm that is coupled to and extends rearward from the front wall into the compartment at an angle such that the arm is neither parallel with the horizontal plane nor parallel with the vertical plane; and
    a valve assembly coupled to the bracket.

2. The refuse body assembly of claim 1, wherein the front wall defines an aperture through which the valve assembly is accessible.

3. The refuse body assembly of claim 2, wherein a portion of the valve assembly extends through the aperture.

4. The refuse body assembly of claim 2, further comprising a removable cover coupled to the front wall, the removable cover positioned to selectively enclose at least a portion of the aperture.

5. The refuse body assembly of claim 4, wherein the removable cover extends at least partially across the aperture to substantially isolate the valve assembly from an exhaust system of the refuse vehicle.

6. The refuse body assembly of claim 1, further comprising a conduit fluidly coupled to the valve assembly, wherein at least a portion of the conduit extends behind the front wall and within the compartment.

7. The refuse body assembly of claim 1, further comprising a packer positioned within the compartment, wherein the packer is repositionable between a first position proximate the front wall and a second position spaced from the front wall.

8. The refuse body assembly of claim 7, wherein the packer has an engagement surface for engaging contents within the compartment, wherein the packer defines a cavity positioned at least one of beneath or behind the engagement surface, and wherein the bracket and the valve assembly at least partially extend into the cavity when the packer is in the first position.

9. The refuse body assembly of claim 1, wherein the angle is a first angle, and wherein the bracket is structured such that the valve assembly is oriented at a second angle different than the first angle.

10. The refuse body assembly of claim 1, further comprising:
a lift assembly coupled to the body, the lift assembly configured to engage a refuse container and lift the refuse container to unload refuse into the compartment;
an ejector slidably coupled to the body and positioned within the compartment;
a first hydraulic actuator positioned to move the lift assembly between a raised position and a lowered position; and
a second hydraulic actuator positioned to move the ejector longitudinally between a retracted position near the front wall and an extended position away from the front wall;
wherein:
the valve assembly is fluidly coupled to at least one of the first hydraulic actuator or the second hydraulic actuator;
the valve assembly is configured to facilitate controlling extension and retraction of the at least one of the first hydraulic actuator or the second hydraulic actuator;
the valve assembly has a first end and a second end opposite the first end; and
the first end of the valve assembly is offset longitudinally and vertically from the second end.

11. The refuse body assembly of claim 10, wherein the first end of the valve assembly is (i) offset vertically above and (ii) offset longitudinally forward or longitudinally rearward of the second end.

12. The refuse body assembly of claim 10, wherein the valve assembly extends longitudinally rearward of the front wall, and wherein the second end of the valve assembly is positioned below a portion of the ejector when the ejector is in the retracted position.

13. A refuse body assembly for a refuse vehicle, the refuse body assembly comprising:
a body defining a compartment, the body including a front wall that defines an aperture;
a bracket coupled to the front wall and extending into the compartment;
a valve assembly coupled to the bracket such that at least a portion of the valve assembly is accessible through the aperture; and
a removable cover coupled to the front wall, the removable cover positioned to selectively enclose at least a portion of the aperture.

14. The refuse body assembly of claim 13, wherein a portion of the valve assembly extends through the aperture.

15. The refuse body assembly of claim 13, further comprising a packer positioned within the compartment, wherein the packer is repositionable between a first position proximate the front wall and a second position spaced from the front wall, wherein the packer has an engagement surface for engaging contents within the compartment, wherein the packer defines a cavity positioned at least one of beneath or behind the engagement surface, and wherein the bracket and the valve assembly at least partially extend into the cavity when the packer is in the first position.

16. The refuse body assembly of claim 13, wherein the front wall defines a vertical plane, and wherein the valve assembly is oriented at an angle relative to the vertical plane.

17. The refuse body assembly of claim 13, wherein the front wall defines a vertical plane, and wherein the valve assembly is (i) oriented horizontally and, therefore, perpendicular to the vertical plane or (ii) oriented vertically and, therefore, parallel to the vertical plane.

18. A refuse body assembly for a refuse vehicle, the refuse body assembly comprising:
a body defining a compartment, the body including:
a bottom wall defining a horizontal plane; and
a front wall defining a vertical plane and an aperture;
a removable cover coupled to the front wall, the removable cover positioned to selectively enclose at least a portion of the aperture; and
a bracket coupled to the front wall, the bracket having an arm extending rearward of the front wall into the compartment at an angle such that the arm is neither parallel with the horizontal plane nor parallel with the vertical plane, the bracket accessible through the aperture.

19. A refuse body assembly for a refuse vehicle, the refuse body assembly comprising:
a body defining a compartment, the body including a bottom wall defining a horizontal plane and a front wall defining a vertical plane;
a bracket coupled to the front wall, the bracket having an arm extending rearward of the front wall into the compartment at an angle such that the arm is neither parallel with the horizontal plane nor parallel with the vertical plane; and
a valve assembly coupled to the bracket such that at least a portion of the valve assembly is disposed within the compartment.

* * * * *